US00RE44098E

(19) United States
(12) Reissued Patent
Arnott et al.

(10) Patent Number: US RE44,098 E
(45) Date of Reissued Patent: Mar. 19, 2013

(54) USING ACCOUNTING DATA BASED INDEXING TO CREATE A PORTFOLIO OF ASSETS

(75) Inventors: Robert D. Arnott, Newport Beach, CA (US); Paul C. Wood, Waltham (GB)

(73) Assignee: Research Affiliates, LLC, Newport Beach, CA (US)

(21) Appl. No.: 13/569,200

(22) Filed: Aug. 8, 2012

Related U.S. Patent Documents

Reissue of:
(64) Patent No.: 7,747,502
Issued: Jun. 29, 2010
Appl. No.: 11/509,002
Filed: Aug. 24, 2006

U.S. Applications:
(63) Continuation-in-part of application No. 11/196,509, filed on Aug. 4, 2005, now Pat. No. 7,620,577, which is a continuation-in-part of application No. 10/961,404, filed on Oct. 12, 2004, now Pat. No. 7,792,719, said (Continued)

(51) Int. Cl.
*G06Q 40/00* (2006.01)
(52) U.S. Cl. ..... 705/36 R; 705/35
(58) Field of Classification Search ..... None
See application file for complete search history.

(56) References Cited

U.S. PATENT DOCUMENTS 4,334,270 A 6/1982 Towers
4,871,177 A 10/1989 Mock
4,933,842 A 6/1990 Durbin et al.
4,974,983 A 12/1990 Givati et al.
5,101,353 A 3/1992 Lupien et al.
5,126,936 A 6/1992 Champion et al.
(Continued)

FOREIGN PATENT DOCUMENTS

EP 1351179 A1 10/2003
EP 1351179 A1 10/2003
(Continued)

OTHER PUBLICATIONS

John D. Bazley, Financial Accounting Concepts and Uses, PWS-Kent Publishing Company, 1988, p. 4.*

(Continued)

*Primary Examiner* — Gregory Johnson
(74) *Attorney, Agent, or Firm* — ATFirm PLLC; Ralph P. Albrecht

(57) ABSTRACT

A system, method and computer program product creates an index based on accounting based data, as well as a portfolio of financial objects based on the index where the portfolio is weighted according to accounting based data. A passive investment system may be based on indices created from various metrics. The indexes may be built with metrics other than market capitalization weighting, price weighting or equal weighting. Non-financial metrics may also be used to build indexes to create passive investment systems. Additionally, a combination of financial non-market capitalization metrics may be used along with non-financial metrics to create passive investment systems. Once the index is built, it may be used as a basis to purchase securities for a portfolio. Specifically excluded are widely-used capitalization-weighted indexes and price-weighted indexes, in which the price of a security contributes in a substantial way to the calculation of the weight of that security in the index or the portfolio, and equal weighting weighted indexes. Valuation indifferent indexes avoid overexposure to overvalued securities and underexposure to undervalued securities, as compared with conventional capitalization-weighted and price-weighted.

61 Claims, 5 Drawing Sheets

Related U.S. Application Data application No. 11/196,509 is a continuation-in-part of application No. 10/159,610, filed on Jun. 3, 2002, now abandoned.

(60) Provisional application No. 60/541,733, filed on Feb. 4, 2004, provisional application No. 60/751,212, filed on Dec. 19, 2005.

(56) References Cited

U.S. PATENT DOCUMENTS 5,132,899 A 7/1992 Fox
5,193,056 A 3/1993 Boes
5,220,500 A 6/1993 Baird et al.
5,414,838 A 5/1995 Kolton et al.
5,590,325 A 12/1996 Kolton et al.
5,592,379 A 1/1997 Finfrock et al.
5,644,727 A 7/1997 Atkins
5,745,706 A 4/1998 Wolfberg et al.
5,761,442 A * 6/1998 Barr et al. ..... 705/36 R
5,778,357 A 7/1998 Kolton et al.
5,806,048 A 9/1998 Kiron
5,812,987 A 9/1998 Luskin et al. ..... 705/36 R
5,812,988 A 9/1998 Sandretto
5,819,238 A * 10/1998 Fernholz ..... 705/36 R
5,819,263 A 10/1998 Bromley et al.
5,873,071 A 2/1999 Ferstenberg et al.
5,875,437 A 2/1999 Atkins
5,878,405 A 3/1999 Grant et al.
5,911,135 A 6/1999 Atkins
5,918,217 A 6/1999 Maggioncalda et al.
5,926,792 A 7/1999 Koppes et al.
5,930,774 A 7/1999 Chennault
5,946,666 A 8/1999 Nevo et al.
5,946,667 A 8/1999 Tull, Jr. et al.
5,978,778 A 11/1999 O'Shaughnessy
5,987,433 A 11/1999 Crapo
6,012,043 A 1/2000 Albright et al.
6,012,044 A 1/2000 Maggioncalda et al.
6,018,722 A 1/2000 Ray et al.
6,021,397 A 2/2000 Jones et al.
6,049,772 A 4/2000 Payne et al.
6,052,673 A 4/2000 Leon et al.
6,061,663 A 5/2000 Bloom et al.
6,064,985 A 5/2000 Anderson
6,073,116 A 6/2000 Boyle
6,078,904 A 6/2000 Rebane
6,088,685 A 7/2000 Kiron et al.
6,092,056 A 7/2000 Tull, Jr. et al.
6,115,697 A 9/2000 Gottstein et al.
6,134,535 A 10/2000 Belzberg et al.
6,154,732 A 11/2000 Tarbox
6,161,098 A 12/2000 Wallman ..... 705/36 T
6,175,824 B1 1/2001 Breitzman et al.
6,233,566 B1 5/2001 Levine et al.
6,240,399 B1 5/2001 Frank et al.
6,247,001 B1 6/2001 Tresp et al.
6,272,474 B1 8/2001 Garcia
6,292,787 B1 9/2001 Scott et al.
6,317,700 B1 11/2001 Bagne
6,317,726 B1 11/2001 O'Shaughnessy
6,317,728 B1 11/2001 Kane
6,336,103 B1 1/2002 Baker
6,338,047 B1 1/2002 Wallman
6,338,067 B1 1/2002 Baker et al.
6,377,963 B1 4/2002 Walker et al.
6,393,409 B2 5/2002 Young et al. ..... 705/37
6,405,204 B1 6/2002 Baker et al.
6,456,982 B1 9/2002 Pilipovic
6,484,151 B1 11/2002 O'Shaughnessy
6,484,152 B1 11/2002 Robinson
6,516,303 B1 2/2003 Wallman ..... 705/36 T
6,598,028 B1 7/2003 Sullivan et al.
6,601,044 B1 7/2003 Wallman
6,622,129 B1 9/2003 Whitworth
6,687,681 B1 2/2004 Schulz et al. ..... 705/36 T
6,839,685 B1 1/2005 Leistensnider et al.
6,859,785 B2 2/2005 Case
6,876,981 B1 4/2005 Berckmans
6,879,964 B2 4/2005 Sauter et al.
6,901,383 B1 5/2005 Ricketts et al.
6,920,432 B1 7/2005 Carey
6,928,418 B2 8/2005 Michaud et al.
6,938,009 B1 8/2005 Herbst et al.
6,941,280 B1 9/2005 Gastineau et al.
6,947,901 B1 9/2005 McCabe et al.
6,985,880 B1 1/2006 Hodgdon et al.
7,016,873 B1 3/2006 Peterson et al.
7,024,388 B2 4/2006 Stefek et al.
7,031,937 B2 4/2006 Brown et al.
7,035,820 B2 4/2006 Goodwin et al.
7,047,217 B1 5/2006 Gottstein
7,050,998 B1 5/2006 Kale et al.
7,076,461 B2 7/2006 Balabon
7,085,738 B2 8/2006 Tarrant
7,089,191 B2 8/2006 Baron et al.
7,089,202 B1 8/2006 McNamar et al.
7,089,205 B1 8/2006 Abernethy
7,092,857 B1 8/2006 Steiner et al.
7,099,838 B1 8/2006 Gastineau et al.
7,107,229 B1 9/2006 Sullivan
7,117,175 B2 10/2006 Arnott
7,127,423 B2 10/2006 Dunning et al.
7,155,468 B2 12/2006 Weiss
7,165,044 B1 1/2007 Chaffee
7,177,831 B1 2/2007 O'Shaughnessy et al. . 705/36 R
7,194,468 B1 3/2007 Bacila et al.
7,206,760 B1 4/2007 Carey et al.
7,222,093 B2 5/2007 Block et al.
7,222,095 B2 5/2007 Squyres
7,249,080 B1 7/2007 Hoffman et al. ..... 705/36 R
7,249,086 B2 7/2007 Bloom et al.
7,251,627 B1 7/2007 Vass
7,272,578 B1 9/2007 Leistensnider et al.
7,295,987 B2 11/2007 Graff
7,299,205 B2 * 11/2007 Weinberger ..... 705/36 R
7,305,362 B2 12/2007 Weber et al.
7,330,831 B2 2/2008 Biondi et al. ..... 705/36 T
7,353,115 B2 4/2008 Bertogg
7,353,198 B2 4/2008 Rios
7,366,692 B2 4/2008 Alcaly et al.
7,395,236 B2 7/2008 Degraaf et al.
7,412,414 B2 8/2008 Michaud et al.
7,418,419 B2 8/2008 Squyres
7,421,405 B2 9/2008 Little
7,444,300 B1 10/2008 Broms et al.
7,496,531 B1 2/2009 Gastineau et al.
7,509,274 B2 3/2009 Kam et al. ..... 705/35
7,509,278 B2 3/2009 Jones
7,571,130 B2 8/2009 Weber
7,571,134 B1 8/2009 Burns
7,587,352 B2 9/2009 Arnott
7,590,584 B1 9/2009 Stokes et al. ..... 705/37
7,620,577 B2 11/2009 Arnott et al.
7,664,694 B2 2/2010 Brandhorst
7,668,773 B1 2/2010 Pruitt ..... 705/36 T
7,685,069 B1 3/2010 Subramanian
7,698,192 B2 4/2010 Kiron
7,742,969 B2 6/2010 Teague et al.
7,747,502 B2 6/2010 Arnott
7,792,719 B2 9/2010 Arnott
7,885,885 B1 2/2011 Strongin, II et al.
7,958,038 B2 6/2011 Choueifaty
8,005,740 B2 8/2011 Arnott et al.
8,024,217 B2 9/2011 Sadre
8,024,258 B2 9/2011 Gastineau et al.
8,131,620 B1 3/2012 Steinberg et al.
8,306,892 B1 11/2012 Gross et al.
2001/0025266 A1 9/2001 Gastineau et al.
2001/0037212 A1 11/2001 Motosuna et al.
2001/0039526 A1 11/2001 Pittenger
2001/0046846 A1 11/2001 Tsumura
2001/0049651 A1 12/2001 Selleck ..... 705/37
2002/0003729 A1 1/2002 Uchihashi 2002/0007329 A1 1/2002 Alcaly et al.
2002/0007332 A1 1/2002 Johnson et al.
2002/0013755 A1 1/2002 Kiron
2002/0023035 A1 2/2002 Kiron
2002/0032629 A1 3/2002 Siegel et al.
2002/0038271 A1 3/2002 Friend et al.
2002/0046038 A1 4/2002 Prokoski
2002/0052820 A1 5/2002 Gatto
2002/0059126 A1 5/2002 Ricciardi
2002/0059127 A1 5/2002 Brown et al. ..... 705/36
2002/0062272 A1 5/2002 Kim et al.
2002/0111891 A1 8/2002 Hoffman et al. ..... 705/36
2002/0116211 A1 8/2002 Hatakeyama
2002/0116310 A1 8/2002 Cohen et al.
2002/0116311 A1 8/2002 Chalke et al.
2002/0120541 A1 8/2002 D'Ambrosio et al. ..... 705/36
2002/0120570 A1 8/2002 Loy
2002/0123952 A1 9/2002 Lipper
2002/0128947 A1 9/2002 Sauter et al.
2002/0128951 A1 9/2002 Kiron
2002/0133447 A1* 9/2002 Mastman ..... 705/36
2002/0138381 A1 9/2002 Tomecek ..... 705/36
2002/0143676 A1 10/2002 Kiron
2002/0143682 A1 10/2002 Bergmann et al.
2002/0156713 A1 10/2002 Gaini
2002/0161684 A1 10/2002 Whitworth
2002/0173998 A1 11/2002 Case
2002/0174045 A1 11/2002 Arena et al. ..... 705/36
2002/0174047 A1 11/2002 Fernholz
2002/0178039 A1 11/2002 Kennedy
2002/0184126 A1* 12/2002 McIntyre et al. ..... 705/35
2003/0004849 A1 1/2003 Velez et al.
2003/0014343 A1 1/2003 Jones
2003/0018556 A1* 1/2003 Squyres ..... 705/36
2003/0018563 A1 1/2003 Kilgour et al.
2003/0018570 A1 1/2003 McCabe et al.
2003/0036989 A1 2/2003 Bhatia
2003/0046215 A1 3/2003 Teague et al.
2003/0061169 A1 3/2003 Long, III et al.
2003/0065599 A1 4/2003 Huang
2003/0065600 A1 4/2003 Terashima et al.
2003/0065602 A1 4/2003 Yip
2003/0065604 A1 4/2003 Gatto
2003/0065605 A1 4/2003 Gatto
2003/0069822 A1 4/2003 Ito et al.
2003/0074293 A1 4/2003 Kiron
2003/0074295 A1 4/2003 Little
2003/0074306 A1 4/2003 Rios et al.
2003/0088489 A1 5/2003 Peters et al.
2003/0093352 A1 5/2003 Muralidhar et al.
2003/0105697 A1 6/2003 Griffin et al. ..... 705/36
2003/0120577 A1 6/2003 Sakui et al.
2003/0120578 A1* 6/2003 Newman ..... 705/36
2003/0126054 A1 7/2003 Purcell
2003/0144947 A1 7/2003 Payne
2003/0154151 A1 8/2003 Biondi et al.
2003/0172018 A1 9/2003 Chen et al.
2003/0172026 A1 9/2003 Tarrant
2003/0182219 A1 9/2003 Bodurtha et al.
2003/0191704 A1 10/2003 Alb
2003/0208427 A1 11/2003 Peters et al.
2003/0212621 A1 11/2003 Poulter et al.
2003/0225657 A1 12/2003 Whaley et al.
2003/0225658 A1 12/2003 Whaley
2003/0225662 A1 12/2003 Horan et al. ..... 705/36
2003/0225663 A1 12/2003 Horan et al. ..... 705/36
2003/0229555 A1 12/2003 Marlowe-Noren
2004/0002910 A1 1/2004 Mizukami ..... 705/36
2004/0024671 A1* 2/2004 Freund ..... 705/35
2004/0039620 A1 2/2004 Ando et al.
2004/0044505 A1 3/2004 Horwitz
2004/0049448 A1 3/2004 Glickman
2004/0068456 A1 4/2004 Korisch
2004/0083150 A1 4/2004 Michaud et al.
2004/0083151 A1 4/2004 Craig et al.
2004/0093294 A1 5/2004 Trevino
2004/0111352 A1* 6/2004 Kim ..... 705/36
2004/0117284 A1 6/2004 Speth
2004/0133497 A1* 7/2004 Spear ..... 705/36
2004/0139031 A1 7/2004 Amaitis et al.
2004/0167847 A1 8/2004 Nathan
2004/0181436 A1 9/2004 Lange
2004/0181477 A1* 9/2004 Sauter et al. ..... 705/36
2004/0193528 A1 9/2004 Sadre
2004/0210504 A1 10/2004 Rutman
2004/0225536 A1 11/2004 Schoen et al.
2004/0236661 A1 11/2004 Benning
2004/0254871 A1 12/2004 Weiss
2004/0267657 A1 12/2004 Hecht
2005/0010481 A1 1/2005 Lutnick et al.
2005/0015326 A1 1/2005 Terry
2005/0033679 A1 2/2005 Rachev et al.
2005/0038725 A1 2/2005 Boyle et al.
2005/0049948 A1 3/2005 Fuscone
2005/0049952 A1* 3/2005 Carter ..... 705/36
2005/0060254 A1 3/2005 Jones
2005/0080704 A1 4/2005 Erlach et al.
2005/0108043 A1 5/2005 Davidson
2005/0108148 A1 5/2005 Carlson
2005/0114169 A1 5/2005 Ansari
2005/0114251 A1 5/2005 Sperandeo
2005/0144107 A1 6/2005 Plonski
2005/0149422 A1 7/2005 Van Lier
2005/0171884 A1 8/2005 Arnott
2005/0171894 A1 8/2005 Traynor
2005/0192889 A1 9/2005 Sauter et al.
2005/0216387 A1 9/2005 Barany et al.
2005/0216407 A1 9/2005 Feldman et al.
2005/0222941 A1 10/2005 Tull
2005/0228731 A1 10/2005 Coates
2005/0228734 A1 10/2005 Pagani
2005/0246255 A1 11/2005 Rousseau et al.
2005/0246260 A1 11/2005 Hodgdon et al.
2006/0015433 A1 1/2006 Arnott et al.
2006/0020531 A1 1/2006 Veeneman et al.
2006/0041489 A1 2/2006 Arnott
2006/0059074 A1 3/2006 Freund
2006/0064364 A1 3/2006 Whitehead
2006/0074787 A1 4/2006 Perg et al.
2006/0080192 A1 4/2006 McCabe
2006/0100946 A1 5/2006 Kazarian
2006/0100949 A1 5/2006 Whaley et al.
2006/0100950 A1 5/2006 Hecht
2006/0100955 A1 5/2006 Baldassini et al.
2006/0149645 A1 7/2006 Wood
2006/0149649 A1 7/2006 Hernandez
2006/0161489 A1 7/2006 Allen et al.
2006/0184438 A1 8/2006 McDow
2006/0184444 A1 8/2006 McConaughy et al.
2006/0190371 A1 8/2006 Almgren et al.
2006/0200395 A1 9/2006 Masuyama et al.
2006/0206398 A1 9/2006 Coughlin
2006/0206405 A1 9/2006 Gambill
2006/0212384 A1 9/2006 Spurgin et al.
2006/0218075 A1 9/2006 Feldman et al.
2006/0224487 A1 10/2006 Galdi
2006/0224494 A1 10/2006 Pinkava
2006/0247996 A1 11/2006 Feldman
2006/0253363 A1 11/2006 Tarrant
2006/0253376 A1 11/2006 Seale et al.
2006/0271452 A1 11/2006 Sparaggis
2006/0294000 A1 12/2006 Bassett et al.
2007/0005471 A1 1/2007 Ho et al.
2007/0005476 A1 1/2007 Ho et al.
2007/0016497 A1 1/2007 Shalen et al.
2007/0022033 A1 1/2007 Ho et al.
2007/0027790 A1 2/2007 Gastineau et al.
2007/0043644 A1 2/2007 Weiss
2007/0043650 A1 2/2007 Hughes et al.
2007/0055598 A1 3/2007 Arnott et al.
2007/0055599 A1 3/2007 Arnott
2007/0061235 A1 3/2007 Timmons et al.
2007/0078743 A1 4/2007 Shilpiekandula et al.
2007/0078744 A1 4/2007 Koss et al.
2007/0112657 A1 5/2007 Huber
2007/0112662 A1 5/2007 Kumar
2007/0118453 A1 5/2007 Bauerschmidt et al.
2007/0118454 A1 5/2007 Bauerschmidt et al.

| | | | |
|---|---|---|---|
| 2007/0118455 | A1 | 5/2007 | Albert et al. |
| 2007/0118459 | A1 | 5/2007 | Bauerschmidt et al. |
| 2007/0118460 | A1 | 5/2007 | Bauerschmidt et al. |
| 2007/0136172 | A1 | 6/2007 | West |
| 2007/0174102 | A1 | 7/2007 | Coulter |
| 2007/0179874 | A1 | 8/2007 | Spirgel et al. |
| 2007/0192228 | A1 | 8/2007 | Phelps et al. |
| 2007/0198389 | A1 | 8/2007 | Orloske et al. |
| 2007/0219894 | A1 | 9/2007 | Guichard |
| 2007/0239571 | A1 | 10/2007 | Michaletz |
| 2007/0239583 | A1 | 10/2007 | Williams |
| 2007/0244787 | A1 | 10/2007 | Lowry |
| 2007/0265952 | A1 | 11/2007 | Kridel |
| 2007/0288339 | A1 | 12/2007 | Squyres |
| 2008/0071699 | A1 | 3/2008 | Catalano-Johnson |
| 2008/0071700 | A1 | 3/2008 | Catalano-Johnson |
| 2008/0071702 | A1 | 3/2008 | Howard et al. |
| 2008/0091622 | A1 | 4/2008 | Yass et al. |
| 2008/0109377 | A1 | 5/2008 | Haig |
| 2008/0140547 | A1 | 6/2008 | Murphy et al. |
| 2008/0208769 | A1 | 8/2008 | Beer et al. |
| 2008/0215502 | A1 | 9/2008 | Sabbia |
| 2008/0235121 | A1 | 9/2008 | Gonen |
| 2008/0243717 | A1 | 10/2008 | Rios |
| 2008/0243721 | A1 | 10/2008 | Joao |
| 2008/0249957 | A1 | 10/2008 | Masuyama |
| 2008/0270317 | A1 | 10/2008 | Waldron et al. |
| 2008/0288387 | A1 | 11/2008 | Meyerhoff, II |
| 2008/0288416 | A1 | 11/2008 | Arnott |
| 2008/0294539 | A1 | 11/2008 | Bassuk |
| 2008/0313100 | A1 | 12/2008 | Weber et al. |
| 2009/0006267 | A1 | 1/2009 | Fergusson et al. |
| 2009/0006274 | A1 | 1/2009 | Levin et al. |
| 2009/0018966 | A1 | 1/2009 | Clark |
| 2009/0063363 | A1 | 3/2009 | Present et al. |
| 2009/0138407 | A1 | 5/2009 | Trease |
| 2009/0164388 | A1 | 6/2009 | Jones |
| 2009/0182683 | A1 | 7/2009 | Taylor |
| 2009/0198631 | A1 | 8/2009 | McGarel |
| 2010/0063942 | A1 | 3/2010 | Arnott |
| 2010/0070429 | A1 | 3/2010 | Spurgin et al. |
| 2010/0153296 | A1 | 6/2010 | Volpert et al. |
| 2010/0191628 | A1 | 7/2010 | Arnott et al. |
| 2010/0262563 | A1 | 10/2010 | Arnott et al. |
| 2010/0287113 | A1 | 11/2010 | Lo et al. |
| 2010/0287116 | A1 | 11/2010 | Arnott et al. |

FOREIGN PATENT DOCUMENTS

| | | | |
|---|---|---|---|
| GB | 2393532 | | 3/2004 |
| GB | 2419011 | A | 4/2006 |
| GB | 2419011 | A | 4/2006 |
| JP | AH10-275177 | | 10/1998 |
| JP | 20010249962 | A | 9/2001 |
| JP | 20010249962 | A | 9/2001 |
| JP | 2002-502514 | | 1/2002 |
| JP | 2002-512405 | | 4/2002 |
| JP | 2003044664 | A | 2/2003 |
| JP | 2003044664 | A | 2/2003 |
| JP | 2003-150779 | | 5/2003 |
| JP | A2003-150779 | | 5/2003 |
| JP | 2003-187052 | | 7/2003 |
| JP | A2004-029882 | | 1/2004 |
| JP | 2004259156 | A | 9/2004 |
| JP | 2004259156 | A | 9/2004 |
| JP | T 2007-502463 | | 2/2007 |
| JP | T 2007-522562 | | 8/2007 |
| JP | 2006-552146 | | 5/2010 |
| VU | WO 02/093322 | | 11/2002 |
| WF | WO 02/095639 | | 11/2002 |
| WO | WO 96/06402 | A2 | 2/1996 |
| WO | WO 96/06402 | A2 | 2/1996 |
| WO | WO 97/22075 | | 6/1997 |
| WO | WO-98/44444 | | 10/1998 |
| WO | WO-99/23592 | A1 | 5/1999 |
| WO | WO-99/23592 | A1 | 5/1999 |
| WO | WO-00/16226 | A1 | 3/2000 |
| WO | WO-00/16226 | A1 | 3/2000 |
| WO | WO00/70484 | | 11/2000 |
| WO | WO 01/33402 | A2 | 5/2001 |
| WO | WO 01/33402 | A2 | 5/2001 |
| WO | WO 01/37168 | A2 | 5/2001 |
| WO | WO 01/37168 | a2 | 5/2001 |
| WO | WO 01/39005 | A2 | 5/2001 |
| WO | WO 01/39005 | A2 | 5/2001 |
| WO | WO-01/46846 | | 6/2001 |
| WO | WO 01/46846 | A1 | 6/2001 |
| WO | WO-01/48629 | A1 | 7/2001 |
| WO | WO-01/48629 | A1 | 7/2001 |
| WO | WO 02/093322 | | 11/2002 |
| WO | WO 02/095639 | | 11/2002 |
| WO | WO 03/009094 | | 1/2003 |
| WO | WO03/032206 | | 4/2003 |
| WO | WO-03/034180 | A2 | 4/2003 |
| WO | WO-03/034180 | A2 | 4/2003 |
| WO | WO2005/019986 | | 3/2005 |
| WO | WO2005/076812 | A2 | 8/2005 |
| WO | WO2005/076812 | A3 | 8/2005 |
| WO | WO 2005/098723 | | 10/2005 |
| WO | WO 2006/089565 | A2 | 8/2006 |
| WO | WO 2006/089565 | A2 | 8/2006 |
| WO | WO-2006/101764 | A1 | 9/2006 |
| WO | WO-2006/101764 | A1 | 9/2006 |
| WO | WO 2006/103474 | A2 | 10/2006 |
| WO | WO 2006/103474 | A2 | 10/2006 |
| WO | WO-2007/027200 | A2 | 3/2007 |
| WO | WO-2007/027200 | A2 | 3/2007 |

OTHER PUBLICATIONS

Business Wire, Investment-Technlgies; (IVES) Jan. 6, 1989, p. 1.*

Diversity-Weighted Indexing, Robert Femholz, Journal of Portfolio Management, Winter 1998, pp. 74-82.*

Investing at the edge (investing in non-capitalization weighted index funds), Jarrod W Wilcox, Journal of Portfolio Management, New York, Spring 1998,vol. 24, Iss. 3; 16 pgs.*

Interrogatory in JP Appeal 2012-4715 of Counterpart JP Application No. 2006-552146, Sep. 18, 2012.

Decision of Rejection in JP 2008-547223, Oct. 30, 2012.

Notice of Preliminary Rejection in KR Counterpart KR 10-2008-7017731, Oct. 29, 2012.

Nonfinal Rejection in U.S. Appl. No. 13/216,238 mailed Dec. 12, 2012.

Communication from the European Patent Office dated Dec. 3, 2009, issued in related European Patent Application No. 03726210.2.

Office Action issued Aug. 19, 2009 in related U.S. Appl. No. 10/961,404.

Office Action received Apr. 28, 2009 in related EP 05 712 005.7.

Office Action issued Jul. 8, 2009 in related U.S. Appl. No. 11/509,002.

Office Action issued Aug. 6, 2009 in related U.S. Appl. No. 10/159,610.

Office Action issued Nov. 26, 2008 in related Eurasian Patent Appl. No. 200870083/27 (with English translation).

Advisory Action dated Feb. 25, 2009 issued in related U.S. Appl. No. 11/196,509.

Office Action dated Nov. 25, 2008 issued in related U.S. Appl. No. 10/961,404.

Office Action issued Dec. 5, 2008 in related CN application No. 200580000459.0.

Decision issued Feb. 2, 2009 in related GB application No. 0616163.2.

Decision issued Feb. 19, 2009 in related GB application No. 0222239.6.

International Search Report and Written Opinion issued Dec. 21, 2007 in related Appl. PCT/US2006/042430.

Kaplan, Paul, "Let's Not All Become Fundamental Indexers Just Yet," Journal of Indexes, Jan./Feb. 2009, pp. 34-37.

Point/Counterpoint, "The Fundamental Debate," Journal of Indexes, Jan./Feb. 2009, pp. 30-33, continued on p. 51.

Prestbo, John, In Perspective; "Weighting It Out," Journal of Indexes, Jan./Feb. 2009, pp. 38-40.

Business Wire, Investment Technologies, (IVES), Jan. 6, 1989, p. 1.

Kalotay, Andrew J. et al., "A Model for Valuing Bonds and Embedded Options," Financial Analysts Journal, May-Jun. 1993, pp. 35-46.

Curran, Greg, "Security Selection for Bond Index Portfolios," Mellon Institutional Asset Management, Standish Mellon, Copyright 2005, publication date unknown.
Jaffe, Jeffrey et al., "Earnings Yields, Market Values, and Stock Returns," The Journal of Finance, vol. XLIV, No. 1, Mar. 1989.
Author Unknown, "Bond Basics: Selecting a Fixed Income Benchmark," www.pimco.com, A company of Allianz, Jul. 2006, pp. 1-5.
Davis, James L., The Cross-Section of Realized Stock Returns: The Pre-Compustat Evidence, The Journal of Finance, vol. 49, No. 5 (Dec. 1994), pp. 1579-1593.
Bernard, Victor et al., "Accounting-Based Stock Price Anomalies: Separating Market Inefficiencies from Risk*," 1996 Contemporary Accounting Research Conference, Sep. 1996, pp. 1-57.
Siracusano, Luciano, "A Fundamental Challenge," The Wisdom Tree, Aug. 9, 2007.
Author Unknown, "The Role of high Yield Bonds," www.pimco.com, Publication, Feb. 2006, pp. 1-5.
Author Unknown, "Emerging Markets May Offer Opportunity to Enhance Returns," www.pimco.com, an Allianz Company, Oct. 2005, pp. 1-3.
Author Unknown, "About Corporate Bonds, Overview," www.investinginbonds.com, The Securities Industry and Financial markets Association, 2005, p. 1.
Author Unknown, "Bond Basics, Fundamental Investment Strategies," www.investinginbonds.com, The Securities Industry and Financial Markets Association, 2005, p. 1.
Author Unknown, "Types of Bonds, Bond and Bond Funds; What You Should Know Before Deciding," www.investinginbonds.com, The Securities Industry and Financial Markets Association, 2005, pp. 1-2.
Lakonishok, Josef et al., NBER Working Paper Series, "Contrarian Investment, Extrapolation, and Risk," National Bureau of Economic Research, Working Paper No. 4360, May 1993.
Chan, Louis K.C., et al., "Fundamentals and Stock Returns in Japan," The Journal of Finance, vol. 46, No. 5 (Dec. 1991), pp. 1739-1764.
Chan, Louis K.C., et al., "The Risk and Return from Factors," The Journal of Financial and Quantitative Analysis, vol. 33, No. 2 (Jun. 1998), pp. 159-188.
Banz, Rolf W. et al., "Sample-Dependent Results Using Accounting and Market Data: Some Evidence," The Journal of Finance, vol. 41, No. 4 (Sep. 1986), pp. 779-793.
Bergstresser, Daniel, et al., "Investment Taxation and Portfolio Performance*," Preliminary Draft, Boston College Finance Wednesday Seminar and the 2006 UNC Tax Symposium, Apr. 12, 2006.
Robert Arnott et al., "Fundamental Indexation;" Research Affiliates Oct. 7, 2004, pp. 1-35.
Author Unknown, FRC Monitor, "Industry Trends," Nov. 2005.
Author Unknown, "Separately Managed Accounts to Become Dominant Vehicle for Individual Securities," Tower Group Research, www.advisorpage.com/modules, Advisor Page, Competitive Intelligence, Feb. 6, 2008.
Pruitt, Ron, "The Tax Advisor: All Hail the Overlay Manager," Placemark Investments, Investment Advisor, Apr. 2005.
Pruitt, Ron, "A Comprehensive View of After-tax Investing and Tax Efficiency," Placemark Investment, 2002.
Coyle, Thomas, "SunGard Hunts Trust Assets With Overlay Offering," SunGard Managed Account Solutions, www.sungard.com/Managed Accounts, Aug. 30, 2004.
Reinhart, Len, "The Bigger Picture: Will Overlay Management Become the New Business Model for Separately Managed Accounts?" Financial-Planning.com, Apr. 1, 2007.
Search Results, TowerGroup, Sep. 25, 2007.
Reinhart, Len, "The Next Big Thing: Unified Managed Accounts Must Mature Some More Before They Are Ready for Prime Time." Financial-Planning.com, Dec. 1, 2003.
Author Unknown, "Generation OPM," Wall Street Technology, www.wallstreetandtech.com, Oct. 25, 2004.
Gaffen, David A., "SMAs Take on Multiple Personalities," www.registeredrep.com, May 1, 2003.
Arnott, Robert D. et al., "The Management and Mismanagement of Taxable Assets," First Quadrant, L.P., Investment Management Reflections, 2000, No. 2.
FRC Monitor, Jan. 2001, pp. 1-12.
Waid, Robert, "Fundamentally Active," IndexUniverse.com, www.indexuniverse.com/index, Feb. 8, 2008, pp. 1-6.
Hemminki, Julius et al., "Fundamental Indexation in Europe," Journal of Asset Management, vol. 8, 6, pp. 401-405, www.palgrave-journals.com/jam, Oct. 26, 2007.
Morris, Stephen, "Caress Working Paper #95-13 Speculative Investor Behavior and Learning," Department of Economics, University of Pennsylvania, Philadelphia, PA, May 1995.
Author Unknown, "MSCI to Adjust for Free Float and to Increase Coverage to 85%," MSCI Press Release, www.msci.com, Geneva, Dec. 10, 2000, pp. 1-3.
Brandhorst, Eric, "MSCI's Methodology Enhancements: Free-Float and Capitalization Extension," www.ssga.com, Jul. 20, 2001, pp. 1-6.
Chance, Don M., "Six One Way, Half-A-Dozen The Other," www.indexuniverse.com/component/content/article/4035, Trading Places, May/Jun. 2008,.
Brock, Woody, The Role of 'Pricing Model Uncertainty,:—Resolving Four Paradoxes in Today's Market Behavior, Strategic Economic Decisions, SED Profile May 2008.
Lydon, Tom; Wasik, John F., iMoney, "Profitable Exchange-Traded Fund Strategies for Every Investor," Chapter 2, The Art of Indexing Using the iMoney Plan, date unknown.
Author Unknown, "The Role of Pricing Model Uncertainty"—Resolving Four Paradoxes in Today's Market Behavior,—Strategic Economic Decisions, www.SEDinc.com, SED Profile, May 2008.
Office Action from related U.S. Appl. No. 10/961,404 mailed Mar. 13, 2008.
Office Action from related U.S. Appl. No. 11/196,509 mailed Mar. 19, 2008.
Bazley, John D., Financial Accounting Concepts and Uses, PWS-Kent Publishing Company, 1988, p. 4.
Fernholz, Robert, Diversity-Weighted Indexing, Journal of Portfolio Management, Winter 1998, pp. 74-82.
International Search Report and Written Opinion from PCT/US2008/003762 mailed Sep. 10, 2008.
International Search Report and Written Opinion issued in PCT/US2007/018534 mailed Sep. 17, 2008.
Office Action issued Oct. 3, 2008 in related U.S. Appl. No. 10/159,610.
Salzinger, Mark, "Interview : Jason Hsu," The Investor's ETF Report, Jan. 2007.
David Hoffman, "Non-Traditional Indexes Gaining Ground in ETF World," Investment News, Feb. 12, 2007.
Rob Wherry, "Ready for an All-ETF Portfolio? Here Are Some Models," SmartMoney.com, Feb. 13, 2007.
Ray Turchansky, "Investment Vehicle Lines Get Blurry: Merits of Passive Versus Active Management Debated," Edmonton Journal, Feb. 14, 2007.
Jonathan Chevreau, "Trading Begins Today on Two New Exchange-Traded Funds From Claymore Investments," National Post (Canada), Feb. 14, 2007.
Trang Ho, "Exchange-Traded Funds: After an Excellent '06, Fast Start For Telecom," Investor's Business Daily, Feb. 16, 2007.
Matthew Richards, "Get Down to the Fundamental Factors," Financial Times, Feb. 17, 2007.
Warren Boroson, "A New Strategy for Stock Indexes," Daily Record, Feb. 18, 2007.
David Hoffman, "Weightings Ignoring Market Caps Gain in Popularity," Pensions&Investments Online, Feb. 19, 2007.
Trang Ho, "Exchange-Traded Funds: Consumer ETFs Reflect Strong Buying Trends," Investor's Business Daily, Feb. 20, 2007.
Diya Gullapalli, "On Tap: Retirement-Oriented Offerings," The Wall Street Journal, Feb. 22, 2007.
Rob Carrick, "For Your RRSP, Take a Page from the CPP," The Globe & Mail (Toronto), Feb. 24, 2007.
Rudy Luukko, "Enhanced Indexing Cuts Costs of Funds," Toronto Star, Feb. 24, 2007.
Brooke Southall, "Malkiel Defends Investing Strategy," Investment News, Feb. 26, 2007.
Brooke Southall, "Merrill Lynch Claymore International Fundamental Index Accelerator Securities, Series 2," Canada Newswire, Feb. 27, 2007.

Susan Trammell, "Applied Science: How to Jump-Start a Quantitative Investment Process," CFA Magazine, Mar./Apr. 2007.
Eric Uhlfelder, "Challenging EAFE: Managers Who Closely Track Market-Cap-Weighted Country Indexes May Miss Opportunities," Financial Advisor Magazine, Mar. 1, 2007.
John C. Bogle, "False Promises: Index Funds That Promise to Beat the Market," Journal of Indexes, Mar./Apr. 2007.
Vincent T. Lowry, "Fundamentally Better: The Case for Revenue Weighting," Journal of Indexes, Mar./Apr. 2007.
Ron Hylton, "It's The Volatility, Stupid: The Source of Excess Returns in Alternative Index Weighting Schemes," Journal of Indexes, Mar./Apr. 2007.
Eugene F. Fama, Kenneth R. French, "Straight Talk: Nouveau Indexes, Noise and the Nonsense of Active Management," Journal of Indexes, Mar./Apr. 2007.
Sonya Morris, Editor, "Introducing Model Portfolios," Morningstar ETFInvestor, Mar. 1, 2007.
Donald Jay Korn, "ETF Mania!," Financial Planning, Mar. 1, 2007.
David Hoffman, "New ETFs Highlight Belief That Simple Is Good," Investment News, Mar. 5, 2007.
Charles Paikert, "Oyster Bar powwow no pearl for Street," Investment News, Mar. 5, 2007.
Charles Paikert, "AIM Investments® Launches AIM Independence Funds," Yahoo!Finance, Mar. 6, 2007.
Charles Leary, "The Harsh Light of Day," IndexUniverse.com, Mar. 8, 2007.
Warren Boroson, "Tough Questions for Smart Manager," Daily Record, Mar. 25, 2007.
Warren Boroson, "New Fundamental Index Fund Listed in Stockholm," XACT, Mar. 26, 2007.
Tim Middleton, "With Market Reeling, Get More Aggressive," MSN Money, Mar. 27, 2007.
Tim Middleton, "Schwab To Launch Fundamental Index Mutual Funds," Reuters, Mar. 27, 2007.
Christine Ong, "AIM Vies For Lifecycle Edge By Diversification," Ignites.com, Mar. 28, 2007.
Karen Dolan, "Morningstar's Take: PIMCO Fundamental IndexPLUS TR D PIXDX," Morningstar, Mar. 28, 2007.
Jason Hsu, Jason Chia-Shang Tuan, "Indexing for an inefficient market," IPA, Apr. 1, 2007.
Jeffrey R. Kosnett, "Are Your Stocks Simply a Mishmash?," Kiplinger's Personal Finance, Apr. 1, 2007.
Brad Zigler, "Fundamentalism and Asset Allocation," Registered Rep, Apr. 1, 2007.
Kevin Burke, "The ETF Weighting Game," Registered Rep, Apr. 1, 2007.
Kathleen M. McBride, "Catching Up With . . . Jeffrey Mortimer," Investment Advisor Magazine, Apr. 1, 2007.
Sree Vidya Bhaktavatsalam, "Schwab Offers 'Fundamental' Index Funds to Beat Market Returns," Bloomberg, Apr. 2, 2007.
Kathleen M. McBride, "A Better Mousetrap?: Schwab Launches Three Fundamental Index Funds," Investment Advisor Magazine, Apr. 2, 2007.
Jesse Emspak, "Mutual Funds & Personal Finance: Schwab Focuses on Key Fundamentals," Investor's Business Daily, Apr. 2, 2007.
Murray Coleman, "New Twist On Indexing: Mutual Funds Meet ETFs," MarketWatch, Apr. 2, 2007.
Rob Wherry, "Schwab Launches Three Funds Similar to Popular ETFs," SmartMoney.com, Apr. 2, 2007.
Rob Wherry, "Schwab Launches Fundamental Index™ Mutual Funds," Yahoo!Finance, Apr. 2, 2007.
Rob Wherry, "Fundamentally Schwab," IndexUniverse.com, Apr. 5, 2007.
Brooke Southall, "Fundamental Differences Over Schwab Funds," Investment News, Apr. 9, 2007.
Max Heuer, "Schwab Looks Up Market," Defined Contribution & Savings Plan Alert, Apr. 9, 2007.
Katie Benner, "Trying To Build A Better Index Fund: Fortune's Guide To Exchange-Traded Funds Based On Fundamental Indexes," CNN Money, Apr. 11, 2007.
Janet Kidd Stewart, "401(k) options worth looking over: Investors should keep track as firms pitch employers more ETFs," Chicago Tribune, Apr. 15, 2007.
John Kimelman, "ETF Pro Says Stocks Aren't Worth The Risk," Barron's, Apr. 20, 2007.
Peter A. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Michael Krause, "S&P 500 Shows Passive Aggressive Side," Yahoo!Finance, Apr. 24, 2007.
Philip Coggan, "Presenting the Portfolio Rebalancing Act: Fundamental Indexation Rejects Weighting Stocks Within a Benchmark by Market Value," Investment Advisor (UK), Apr. 28, 2007.
Paul J. Lim, "The Indexing Wars," U.S. News & World Report, Apr. 29, 2007.
Douglas Appell, "Fundamental Indexing Superiority Disputed: Claim of Cap-Weighting's Drag on Return is 'False'," Pensions &Investments Online, Apr. 30, 2007.
Douglas Appell, "Fund News (excerpt)," No-Load Fund Investor, May 1, 2007.
Kathleen M. McBride, "The IA 25: Robert Arnott," Investment Advisor Magazine, May 1, 2007.
James Picerno, "The ETF revolution is looking more speculative by the day," Wealth Manager, May 1, 2007.
Jonathan Clements, "Why Aiming for Average Has Its own Genius," The Wall Street Journal, May 6, 2007.
Peter Gibson, Ed Sollbach, Jeff Evans, Elizabeth Leung, "Research Comment: Portfolio Strategy & Quantitative Research," Desjardins Securities, May 7, 2007.
Douglas Appel, "Disputing the superiority of fundamental indexing," Investment News, May 7, 2007.
Unknown, "The most dangerous patent in finance! Is fundamental indexing patently absurd?," Research Comment, Desjardins Securities, May 7, 2007.
Heather Bell, "Fundamental Analysis," IndexUniverse.com, May 8, 2007.
Heather Bell, "News Briefs: Analysts wary of fundamental indexes," Pensions&Investments Online, May 14, 2007.
Julian Harding, "Worth the Weight," Pensions Management, May 15, 2007.
Vernon Wessels, "Plexus Will Use Arnott's Index to Choose South African Stocks," Bloomberg, May 18, 2007.
Vernon Wessels, "Plexus scores home run with international partner," Fanews, May 18, 2007.
Jackie Cameron, "New threat for active asset managers," Moneyweb, May 18, 2007.
Kazuaki Fujita, "Eye On Fundamentals Buoying Japanese Investors (translated)," Nikkei Financial Daily, May 18, 2007.
Rob Carrick, "The case for blending passive, active indexing," The Globe & Mail (Toronto), May 19, 2007.
Warren Boroson, "Expert predicts volatile market," Daily Record, May 20, 2007.
Regis Nyamakanga, "Stock index system due to launch in SA," Business Day, May 21, 2007.
Jesse Emspak, "Exchange-Traded Funds: Fundamental Indexing Fuels PowerShares ETF," Investor's Business Daily, May 23, 2007.
Jesse Emspak, "Four New Lyxor ETFs on Fundamental Indices Launched in the XTF Segment," Deutsche Borse Group, May 24, 2007.
Rob Carrick, "Got high-dollar blues? Currency neutrality can bring peace of mind," The Globe & Mail (Toronto), May 24, 2007.
Consuelo Mack, "A message from Consuelo (an email to WealthTrack subscribers from Consuelo Mack)," PBS WealthTrack, May 24, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
John Authers, "It's time to point the finger at the index," Financial Times, May 26, 2007.
Burton Malkiel, "Many Happy Returns," Barron's, May 28, 2007.
Don Vialoux, "More ways to access Japan: Seven exchange-traded funds now available," National Post (Canada), May 28, 2007.

Brad Zigler, "Fundamentalists at the Gates: The Trouble With Cap-Weighted Indexes," Seeking Alpha, May 31, 2007.
Rob Wherry, "Enhanced Index Funds Make a Move on Their Older Brethren," SmartMoney.com, May 31, 2007.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Stephen P. Brown, "Actively Managed ETFs: The Next Generation?," Registered Rep, Jun. 1, 2007.
David A. Geracioti, "From Theory to Practice," Registered Rep, Jun. 1, 2007.
Laura du Preez, "New index investment method promises more," Personal Finance, Jun. 2, 2007.
Rob Wherry, "The Index-Fund Makeover," The Wall Street Journal, Jun. 2, 2007.
Warren Boroson, "Having 'fun' in market is costly," Daily Record, Jun. 3, 2007.
Sophia Grene, "The fundamental rules apply: Rising interest in wealth weighted indices," Financial Times, Jun. 4, 2007.
Sophia Grene, "IPM launches four Fundamental Index™ Funds," Press Release, Jun. 5, 2007.
David Williams, "Want another 5% on top? (Interview with Paul Stewart)," Business Day, Jun. 7, 2007.
Sophia Grene, "Dilsaver Reveals Schwab Funds' Biggest Secret," MutualFundWire.com, Jun. 7, 2007.
Julia Taylor, "New Funds: Informed Portfolio Management," Financial Times, Jun. 11, 2007.
Pam Black, "Press Release for 'Index Smackdown' debate between Rob Arnott and Gus Sauter," Financial Planning, Jun. 12, 2007.
Lawrence Carrel, "Godfather of Fundamental Indexing Faces Challenge," TheStreet.com, Jun. 13, 2007.
Barry Critchley, "You learn something new every day: New tricks to make the market work better," National Post (Canada), Jun. 15, 2007.
Pauline Skypala, "Spa ETF's Multi-launch set to expand range of ETF trackers," Financial Times, Jun. 18, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Jesse Emspak, "Exchange-Traded Funds: PowerShares Launches Foreign Index Funds," Investor's Business Daily, Jun. 20, 2007.
Ellen Roseman, "Canadians spread cash worldwide," Toronto Star, Jun. 20, 2007.
John Kimelman, "Sampling the ETF Smorgasbord," Barron's, Jun. 22, 2007.
Kevin Bailey, "New Funds Are Old Hat," Herald Sun (Australia), Jun. 25, 2007.
Matthew Hougan, "International RAFI ETFs List on ARCA," IndexUniverse.com, Jun. 25, 2007.
Jonathan Chevreau, "One In Ten Licensed For ETF Run-Up," National Post (Canada), Jun. 25, 2007.
Jonathan Chevreau, "PowerShares Launches Four New FTSE RAFI™ International ETFs on NYSE Arca," Press Release, Jun. 25, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "PowerShares Expands Its Global ETF Initiative Strategy at NYSE," Press Release, Jun. 25, 2007.
Tim Middleton, "Don't follow the dumb money," MSN Money, Jun. 26, 2007.
Matthew Hougan, "ETF Watch: Jun. 7-25," IndexUniverse.com, Jun. 27, 2007.
Rob Wherry, "New From Morningstar's Conference," SmartMoney.com, Jun. 28, 2007.
Mark Salzinger, "Navigating Choppier Waters With ETFs, Funds & Stocks," No-Load Fund Investor, Jul. 1, 2007.
John Spence, "Tempest in an index fund: Robert Arnott and John Bogle clash over best indexing strategy," MarketWatch, Jul. 1, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
Trang Ho, "Foreign ETF Assets Up 24% So Far This Year," Investor's Business Daily, Jul. 11, 2007.
Charles Paikert, "Index battle (p. 2)," Investment News, Jul. 16, 2007.
Sonya Morris, "Measuring the Market's Value," Morningstar, Jul. 16, 2007.
Gastineau, Gary L., "The Cutting Edge," IndexUniverse.com, Jan. 2007.
International Search Report issued in related PCT/US2005/002345 mailed Dec. 19, 2006.
Arnott, et al., "Fundamental Indexation," Financial Analysis Journal, vol. 61, No. 2, pp. 83-89, Mar./Apr. 2005.
Arnott et al., "Redefining Indexation," Research Affiliates, LLC, pp. 1-24, 2004.
Author Unknown, "MSCI Methodology Book: MSCI Global Value and Growth Index Series," Morgan Stanley Capital International Inc., pp. 1, 2, 8-11, 2003.
Author Unknown, "About the America's Fastest Growing companies Family of Stock Indexes," America's Fastest Growing Companies, Jan. 2002.
Author Unknown, "America's Fastest Growing Companies Index," America's Fastest Growing Companies, Jan. 2002.
Author Unknown, "America's Fastest Growing Companies Midcap Index," America's Fastest Growing Companies, Jan. 2002.
Author Unknown, "America's Fastest Growing Companies LargeCap Index," America's Fastest Growing Companies, Jan. 2002.
Author Unknown, "America's Fastest Growing Companies Total Growth Index," America's Fastest Growing Companies, Jan. 2002.
Author Unknown, "CME: Goldman Sachs Commodity Index (GSCI) to include CME Feeder Cattle in 2002 INdex Weighting," Nov. 7, 2001.
Warren Buffet, "Letter to Bershire Hathaway, Inc. Shareholders," pp. 3, 16, 19, 1999.
Chernoff, Joel, "A New Look in Benchmarks: Consultant Devises Alternative Based on Country Wealth," Pensions & Investments Online, Issue Date: Apr. 14, 1997.
Raub, David, "Rethinking Indexing," www.NorthBaybiz.com, Issue: Apr. 2006.
Author Unknown, "Methodology for the Management of the FTSE RAFI (Research Affiliates Fundamental Index) Index Series," The FTSE RAFI Index Series Ground Rules, Version 1.1, Dec. 2005.
Serwer, Andy, "Brains, Pluck, and Bucks," CNNMoney.com/magazines/fortune/fortune_archives, Jul. 3, 2006.
Arnott, Robert, "Retrospectives on Selected Fundamental Index Strategies," Research Affiliates, Dec. 2005.
Treynor, Jack, "Perspectives; Why Market-Valuation-Indifferent Indexing Works," Financial Analysts Journal, vol. 61, No. 5, CFA Institute, Sep./Oct. 2005.
Arnott, Rob and Hennessy, David, "Research Affiliates Fundamental Index," Feb. 2006.
Author Unknown, "PowerShares FTSE RAFI US 1000 Portfolio," www.powershares.com, PRF Facts, Sep. 30, 2005.
Markowitz, Harry M., "Market Efficiency: A Theoretical Distinction and So What?" www.cfapubs.org, Financial Analysts Journal, Reflections, CFA Institute, Sep./Oct. 2005, pp. 17-30.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Hsu, Jason C. and Campollo, Carmen, "New Frontiers in Index Investing," Journal of Indexes, Jan./Feb. 2006, pp. 32-34, 36, 37, 58.
Makepeace, Mark, "FTSE: Coming to America," Journal of Indexes, Jan./Feb. 2006, pp. 38-39.
Blanchett, David, "Building The Best Index; Equal-Weighting vs. Market Capitalization," Journal of Indexes, Jan./Feb. 2006, pp. 40-42.

Gastineau, Gary, "Is Indexing Ready for the Challenges of the 21st Century?", Journal of Indexes, The Cutting Edge, Mar./Apr. 2006, pp. 32-35.
Author Unknown, "William F. Sharpe Awards—Plus Editorial Board Meeting Excerpts," Journal of Indexes, Mar./Apr. 2006, pp. 36-41.
Author Unknown, "FTSE/RAFI PowerShares ETF Launches on Big Board," Journal of Indexes, Mar./Apr. 2006, pp. 51-52.
Leake, Thomas and Morris, David, "Where Next For the Index Business Model? Bringing Low Cost to the World of Active Management," Journal of Indexes, May/Jun. 2006, pp. 22-26.
Schoenfeld, Steven A. And Ginis, Robert E., "Worth Weighting For? A Survey and Critique of Alternatively Weighted Indexes," Journal of Indexes, May/Jun. 2006, pp. 10-21.
Author Unknown, "CalPERS Goes Fundamental," News, Indexing Developments, Journal of Indexes, May/Jun. 2006, p. 52.
Arnott, Robert D., "What Cost Noise?" Financial Analysts Journal, Editor's Corner, CFA Institute, Mar./Apr. 2005, pp. 10-14.
Author Unknown, "Dividend Party Goes Global," Journal of Indexes, Mar./Apr. 2006, p. 52.
DRM Portion of CalPERS' Presentation Given on Jan. 12, 2001, 4 pages.
D. Morris, AIMIC Press Conference Presentation—Tokyo, May 29, 1998 (10 pages).
J. Chernoff, "A New Look in Benchmarks: Consultant Devises Alternative Based on Country Wealth," Pensions & Investments Onling (pionline.com), Apr. 14, 1997 (4 pages).
"Index Industry Leaders . . . In Their Own Words," Journal of Indexes, Sep./Oct. 2006, pp. 10-21.
Scott Burns, "Next-Generation Index Funds Coming," Dallas Morning News, Nov. 26, 2004.
Arnott, Robert, Hsu, Jason, Moore, Phil, "Redefining Indexation," Sep. 9, 2004.
"Optimal Value-Weighted Portfolios," Economist's View: Value Weighted Portfolios, Jun. 14, 2006.
"Stock Market Perspective: Better Ways to Index?" http://www.pankin.com/persp062.pdf.
Wooley, Scott, "The Index Insurgents," Forbes.com, Magazine article, Oct. 30, 2006.
"Memorandum of Points and Authorities in Support of Unopposed Motion for Leave to File Second Amended Answer, Affirmative Defenses and Counterclaims," in Case No. SACV11-01846 Doc (ANx), Jul. 24, 2012.
"Notice of Unopposed Motion and Unopposed Motion for Leave to File Second Amended Answer,Affirmative Defenses and Counterclaims," in Case No. SACV11-01846 Doc (ANx), Jul. 24, 2012.
"Proposed Order Granting Motion for Leave to Amend," in Case No. SACV11-01846 Doc (ANx), Jul. 24, 2012.
"Proof of Service," in Case No. SACV11-01846 Doc (ANx), Jul. 24, 2012.
"Exhibit A to Second Amended Answer, Affirmative Defenses and Counterclaims," in Case No. SACV11-01846 Doc (ANx), Jul. 24, 2012.
"Declaration of Peter J. Wied in Support of Motion for Leave to File Second Amended Answer, Affirmative Defenses and Counterclaims," in Case No. SACV11-01846 Doc (ANx), Jul. 24, 2012.
European Search Report from EP 08727072.4, Dec. 30, 2011.
iShares, SEC Form N-1A Registration Statement under the Securities Act of 1933 and Investment company act of 1940, Aug. 18, 2003, 1-52.
Robert C. Jones, "Earnings Basis for Weighting Stock Portfolios," GSAM, Pensions & Investments, Aug. 5, 1990, pp. 1-2.
Jones, R. C. ,"Quantitative Equity Earnings Weighted Index," 1990, pp. 1-22.
Wood and Evans, "Fundamental Profit Based Equity Indexation," Journal of Indexing, 2003, pp. 1-8.
"Rules for the Management of the FTSE Global Wealth Allocation (GWA) Index Series," FTSE, Oct. 2007, pp. 1-15.
AIMIC Press Conference, Tokyo, Japan, May 29, 1998, pp. 1-8.
Chernoff, J., "A New Look in Benchmarks: Consultant Devises Alternative Based on Country Wealth," Apr. 15, 1997 pp. 1-4.
"About the America's Fastest Growing Companies Family of Stock Indexes," America's Fastest Growing Companies, Individual Investor Group, Inc., www.afgc.com, Methodology, Jan. 24, 2002, pp. 1-11.
MSCI Global Value and Growth Index Series, Index Construction Objectives and Methodology for the MSCI Global Value and Growth Index Series, May 11, 2004, pp. 1-28.
S&P MidCap 400 Registration Statement, Jan. 19, 1996, pp. 1-87.
StreetTracks Prospectus, Fortune e-50 Index Fund, Sep. 25, 2000, pp. 1-36.
Haugen and Baker, "The efficient market inefficiency of capitalization-weighted stock portfolios," The Journal of Portfolio Management, Spring 1991, pp. 1-6.
ITG Research, ITG Australia Ltd., "A Quick Guide to Tax Efficient Investment," Nov. 1, 2005.
"First Dividend Exchange Traded Fund Launched by iShares on the New York Stock Exchange," iShares Press Release, Nov. 7, 2003.
"Dow Jones Indexes To Launch Dividend Index," Dow Jones Indexes—a CME Group Company, New York, Oct. 30, 2003.
Dow Jones U.S. Select Dividend Index(SM) Methodology, METH-ETF-510-091233, Sep. 2011.
"Down Jones Indexes, Dow Jones Select Dividend Index Summary Report", on or about Oct. 2003.
"Earnings Basis for Weighting Stock Portfolios," GSAM, Robert C. Jones, Pensions & Investments, Aug. 5, 1990.
Jones, Robert C. "Quantitative Equity-Earnings Weighted Index," Jones EWI Marketing Materials, pp. 1-22, 1990.
"Goldman Sachs, Portfolio Strategy, Stock Selection," Aug. 31, 1988.
"S&P SmallCap 600 Equity Indices", FactSheet, McGraw-Hill Financial, pp. 1-3, 2011.
"S&P MidCap 400 Equity Indices", FactSheet, McGraw-Hill Financial, pp. 1-3, 2011.
"S&P MidCap 400" SEC Registration Statement, pp. 1-87, Jan. 19, 1996.
"Mergent, Inc.'s Dividend Achievers Index (™) Achieves 18.67% Total Return in 2003-Index includes U.S. Stocks that have raised their dividends for 10 consecutive years or longer," WayBack Machine—Feb. 22, 2004, Jan. 12, 2004.
McLean, Bethany, "Introducing The Fortune Stock Indexes The Fortune 500 Index and the Fortune e-50, Index represent the size, strength, and amazing inventiveness of American business," Fortune Magazine, CNN Money, Mar. 6, 2000.
"Dividend Achievers (™) Introduction," Indxis/Indices, printed May 3, 2012.
French and Fama, "The Cross-Section of Expected Stock Returns," The Journal of Finance, vol. XLVII, No. 2, pp. 427-465, Jun. 1992.
"Fortune Introduces The Fortune 500 Index and The Fortune e-50 Index: Two Stock Market Indexes Designed As New Metrics for the New Economy," BusinessWire, pp. 1-3, Feb. 22, 2000.
"Fortune e-50(™) Index Tracking Stock," Contract Specifications, Spec. Sheet, streetTRACKS, pp. 1-3, printed Mar. 15, 2012.
"Fortune 500 Index Fund and Fortune e50 Index Fund," streetTRACKS Prospectus, Tracked By State Street, pp. 1-36, Sep. 25, 2000.
"Dow Jones Sector Titans Indexes (™) Methodology," METH-ETF-793-070711, pp. 1-3, Jul. 2011.
Knoepfel, Ivo, "Dow Jones Sustainability Group Index: A Global Benchmark for Corporate Sustainability," Elsevier Science Inc., Corporate Environmental Strategy, pp. 1-10, 2001.
"DFA—A Better Way to Invest," Vista Capital Partners, pp. 1-7, Jun. 30, 2011.
Bethany McLean, "The FORTUNe-50 Index More Than Just Dot-Coms—As the Internet Broadens from the realm of geeks to encompass much of business, how do you track its performance? Here's our proposal: an index of e-stocks with the potential to upstage the Dow," Fortune Magazine, CNNMoney, pp. 1-4, Dec. 6, 1999.
Allen R. Gillespie, Money Manager Interview-Alternative Asset Management, The Wall Street Transcript,"Profit Weighted 100 Fund," pp. 1-4, 2006.
Mitchell, Wesley C., "A Critique of Index Numbers of the Prices of Stocks," Chicago Journals, Journal of Political Economy, vol. 24, No. 7, accessed Feb. 21, 2012, Jul. 1916.

U.S. Appl. No. 60/494,974, filed Aug. 14, 2003 as provisional patent application, file history excerpts, pp. 1-38, child of US20050049952 A1, published Mar. 3, 2005.
"US Broad Dividend Achievers (™) Index," Indxis, 19.057 Mergent Broad Dividend Achievers Index, noting DAA ticker symbol since Dec. 5, 2003, 2011.
"MSCI Global Value and Growth Index Series, Index Construction Objectives and Methodology for the MSCI Global Value and Growth Index Series," 19.034 MSCI Methodology Book, GVG Methodology, pp. 1-28,May 2004.
"MSCI Index Calculation Methodology," 19.033 MSCI, IndexCalculation Methodology, last updated Jul. 2005.
Haensly, Paul J., Tripathy, Niranjan, and Peak, Daniel, "Tracking Error in the Dow Jones Industrial Average Versus Alternative Market Indices: New Evidence," pp. 1-17, Spring 2003.
Haugen, Robert A., and Baker, Nardin L."The efficient market inefficiency of capitalization-weighted stock portfolios," The Journal of Portfolio Management, pp. 35-40, Spring 1991.
Eun, Cheol S.,"The Benchmark Beta, CAPM, and Pricing Anomalies," Oxford Economic Papers, New Series, vol. 46, No. 2, Oxford Journals, Oxford University Press, pp. 330-343, Apr. 1994.
Wood, Paul, and Evans, Richard, "Fundamental Profit Based Equity Indexation," Journal of Indexing, pp. 1-8, 2003.
Borgen, Michael J., "Enhancing market value weighted indexes," ProQuest Dissertations and Theses; pp. 1-75, 2005.
Amenc, Noel, Faff, Robert, and Martellini, Lionel, "Desperately Seeking Pure Style Indexes," Risk and Asset Management Research Centre, Nov. 25, 2003.
Gastineau, Gary L., "Beating the Equity Benchmarks," Financial Analysts Journal, vol. 50, No. 4, pp. 6-11, Jul.-Aug. 1994.
Fielitz, Bruce D., and Muller, Frederick L.,"A Simplified Approach to Common Stock Valuation," Financial Analysts Journal, vol. 41, No. 6, pp. 35-41, Nov.-Dec. 1985.
Alexander, Gordon J., "A Reevaluation of Alternative Portfolio Selection," Journal of Financial and Quantitative Analysis, pp. 1-9, Mar. 1978.
Stutzer, Michael, "A Portfolio Performance Index," Financial Analysts Journal, vol. 56, No. 3, pp. 52-61, CFA Institute, May-Jun. 2000.
Mamaysky, Harry, "A Model for Pricing Stocks and Bonds," Yale International Center for Finance, Yale ICF Working Paper No. 02-10, Yale International Center for Finance, Apr. 23, 2002.
Siracusano, Luciano, "A Fundamental Challenge—Is there a better way to index," Journal of Indexes, Sep./Oct. 2007—The Alternative Issue, pp. 1-12, 2007.
Abanmay, Zeyad Abdulrahman "A factor analytic approach to global portfolio management," University of Missouri-Rolla, Dissertation, pp. 1-24, 1996.
"Rules for the Management of the FTSE Global Wealth Allocation (GWA) Index Series," FTSE, Index Methodology 2007, pp. 1-15, V 1.5, Oct. 2007.
"FTSE GWA Index Series Methodology," Overview, 2007.
"FTSE introduces wealth weighted index family with GWA—New series welcomed by investment consultant community,—Research shows outperformance against traditional cap weighted indices," media information, Oct. 17, 2005.
"Trustee Guide to Protecting Your Pension Scheme—Diversify your equity portfolio with a global wealth weighted index—All equity indexes are not the same and trustees must ensure that are spreading their risks properly says David Morris, CEO of Global Wealth Allocation (GWA)," Engaged Investor, May/Jun. 2008.
"AIMIC Press Conference, David Morris, Tokyo," Global Wealth Allocation,pp. 1-8, Delivered Friday May 29, 1998.
"GWA: Building Portfolios Without Prices," GWA website screenshot, http://www.globalwealthallocation.com/, printed on Dec. 12, 2011.
"GWA: Building Portfolios Without Prices: Investment Philosophy," GWA website screenshot, http://www.globalwealthallocation.com/Philosophy.html, printed on Dec. 12, 2011.
"CalPERS Presentation, David Morris," Global Wealth Allocation,pp. 1-3, Delivered Jan. 12, 2001.
Chernoff, Joel, "A New Look in Benchmarks: Consultant Devises Alternative Based on Country Wealth," P& I, pp. 1-4, Apr. 14, 1997.
Journal of Indexes Staff, "Bloomberg Enters Index-Licensing Business," and "America's Fastest Growing Companies SmallCap 500, LargeCap 50 and MidcCap 300," Journal of Indexes, pp. 5, 6, IndexUniverse.com, pp. 1-23, printed Jan. 8, 2012, (C) 2001.
"About the America's Fastest Growing Companies (SM) Family of Stock Indexes," "MidCap Index," "LargeCap Index," "Total Growth Index," America's Fastest Growing Companies Webpage, Methodology, pp. 1-11, http://www.afgc.com, printed Jan. 24, 2002, (c) 1997-2002.
Index Funds Staff, "Amex/Tokyo Cross-List ETFs," http://www.indexfunds.com/articles/20010619_Tokyo_new_gen_ST.htm, accessed Apr. 4, 2012.
"Individual Investor Group, Inc. Announces Two New Indexes, LargeCap and MidCap Indexes Extend America's Fastest Growing Companies (R) brand," Mar. 26, 2001.
"American Stock Exchange Begins Calculating and Disseminating—Values of Three—New Stock Indexes from Individual Investor Group, Inc.—the America's Fastest Growing Companies (™) Total Market, LargeCap 50, and MidCap 300 Indexes," Jun. 14, 2012.
Arnott, Robert D., "Redefining Indexation," pp. 1-24, 2004.
DOC #20, Feb. 22, 2012, Case 8:11-cv-01846-DOC-AN, "Defendant's Notice of Motion and Motion for Judgment on the Pleadings Based on Unpatentable Subject Matter: Memo of Points and Authorities in Support Thereof", Case No. SACV11-01846 DOC (ANx), pp. 1-33.
Civil Minutes re Motion for Judgment by Judge Carter.
Doc #20-1, Appendix A, Feb. 22, 2012, Case 8:11-cv-01846-DOC-AN, pp. 1-2.
Doc #20-2, Appendix B, Feb. 22, 2012, Case 8:11-cv-01846-DOC-AN, pp. 1-4.
Doc #20-3, Appendix C, Feb. 22, 2012, Case 8:11-cv-01846-DOC-AN, pp. 1-4.
Doc #25 "Plaintiff's Memo of Points and Authorities in Opposition to Defendant's Motion for Judgment on the Pleadings," Case 8:11-cv-01846-DOC-AN,Filed Mar. 12, 2012, Case No. SACV11-01846 DOC (ANx), pp. 1-33.
Doc #25-1 "Natalie J. Morgan Declaration ISO Plaintiff's Memo of points and authorities in Opposition to Defendants' Motion for Judgment on the Pleadings," Case 8:11-cv-01846-DOC-AN,Filed Mar. 12, 2012, Case No. SACV11-01846 DOC (ANx), pp. 1-3.
Doc #25-3 "Declaration of Mr. Himanshu Sudhir Surti Re Plaintiff's Memo of Points and Authorities in Opposition to Defendant's Motion for Judgment on the Pleadings," Case 8:11-cv-01846-DOC-AN,Filed Mar. 12, 2012, Case No. SACV11-01846 DOC (ANx), pp. 1-5.
Doc #31 "Defendants' Reply Memo in further support of Motion for Judgment on the Pleadings Based on Unpatentable Subject matter," Case 8:11-cv-01846-DOC-AN,Filed Mar. 19, 2012, Case No. SACV11-01846 DOC (ANx), pp. 1-30.
Doc #32-1 "Corrected Defendants' Reply Memo in further support of Motion for Judgment on the Pleadings Based on Unpatentable Subject Matter," Case 8:11-cv-01846-DOC-AN,Filed Mar. 19, 2012, Case No. SACV11-01846 DOC (ANx), pp. 1-30.
Doc #33-1 "Second Corrected Defendants' Reply Memo in Further Support of Motion for Judgment on the Pleadings Based on Unpatentable Subject Matter," Case 8:11-cv-01846-DOC-AN,Filed Mar. 20, 2012, Case No. SACV11-01846 DOC (ANx), pp. 1-30.
Doc #34 "Notice of Supplemental Authority," Case 8:11-cv-01846-DOC-AN,Filed Mar. 20, 2012, Case No. SACV11-01846 DOC (ANx), pp. 1-30.
Doc #39 "Plaintiffs Notice of Supplemental Authority," Case 8:11-cv-01846-DOC-AN,Filed Mar. 20, 2012, Case No. SACV11-01846 DOC (ANx), pp. 1-4.
Doc #45 "Second Notice of Supplemental Authority," Case 8:11-cv-01846-DOC-AN,Filed Mar. 20, 2012, Case No. SACV11-01846 DOC (ANx), pp. 1-4.
Doc #45-1 "Exhibit A," "Second Notice Exhibit A," Case 8:11-cv-01846-DOC-AN,Filed Apr. 20, 2012, Case No. SACV11-01846 DOC (ANx), pp. 1-7.
Doc #59 "Notice of Motion and Motion for Leave to File First Amended Answer and Counterclaims," Case 8:11-cv-01846-DOC-AN,Filed Jun. 11, 2012, Case No. SACV11-01846 DOC (ANx), pp. 1-3.

Doc #59-1 "Declaration of Peter J. Wied ISO Motion for Leave to File First Amended Answer and Counterclaims," Case 8:11-cv-01846-DOC-AN,Filed Jun. 11, 2012, Case No. SACV11-01846 DOC (ANx), pp. 1-2.
Doc #59-2 "Exhibit A to Motion for Leave to File First Amended Answer and Counterclaims," Case 8:11-cv-01846-DOC-AN,Filed Jun. 11, 2012, Case No. SACV11-01846 DOC (ANx), pp. 1-75.
Doc #59-3 "Memo of Points and Authorities in support of motion for leave to file First Amended answer ISO Motion for Leave to File First Amended Affirmative Defenses and Counterclaims," Case 8:11-cv-01846-DOC-AN,Filed Jun. 11, 2012, Case No. SACV11-01846 DOC (ANx), pp. 1-9.
"Defendants' Preliminary Invalidity Contentions," Case 8:11-cv-01846-DOC-AN, Filed Jun. 11, 2012, Case No. SACV11-01846 DOC (ANx), pp. 1-546.
Fundamental Indexation, Robert Arnott, 2004; 36-pages.
Arnott, Robert D., "An Overwrought Orthodoxy," Institutional Investor Magazine, Dec. 2006, https://www.rallc.com/ideas/pdf/Institutional_Investor_Dec_2006_An_Overwrought_Orthodoxy.pdf.
Burke, Kevin, ETF Special Report, Apr. 1, 2007, www.wealthmanagement.com, http://wealthmanagement.com/archive/etf-special-report-3, "Robert Jones at Goldman Sachs Asset Management is said to be the first to reweight the S&P based on adjusted operating earnings. He managed the firm's equity portfolios on this basis and beat the S&P 500 by 1 percentage per year between 1990 and 1996. But the funds didn't attract much in assets."
Dow Jones Select Dividend Indexes, Overview Brochure, Jan. 2012, http://www.djindexes.com/mdsidx/downloads/brochure_info/Dow_Jones_Select_Dividend_Indexes_Overview.pdf, "Dow Jones Indexes pioneered the category of dividend indexing with its 2003 launch of the Dow Jones U.S. Select Dividend IndexSM."
Office Action from U.S. Appl. No. 11/931,913 mailed Jul. 23, 2010.
Office Action from U.S. Appl. No. 10/159,610 mailed May 17, 2010.
Office Action in JP Counterpart Application No. 2006-552146 Dated May 25, 2010.
Australian Examiner's Report for AU Application 2005213293, Dated May 19, 2010.
Supplemental EP Search Report for EP06827143.6 mailed Jul. 2, 2010.
Diversity-Weighted Indexing, Robert Fernholz, Journal of Portfolio Management, Winter 1998, pp. 74-82.
Investing at the edge (investing in non-capitalization weighted index funds), Jarrod W. Wilcox, Journal of Portfolio Management, New York, Spring 1998, vol. 24, Iss. 3; 16 pages.
ITG Research, ITG Australia Ltd, "A Quick Guide to Tax Efficient Investment," Nov. 1, 2005.
Office Action from U.S. Appl. No. 12/819,199 mailed Dec. 15, 2011.
EPC Communication from EP 07811461.8, dated Nov. 23, 2010.
EP Office Communication from EP 05712005.7 dated Dec. 23, 2008.
International Search Report for PCT/US 08/03762, dated Sep. 10, 2008.
Examination Communication in EP 06827143.6 mailed Jan. 30, 2012.
Decision of Rejection in JP 2006-552146, mailed Oct. 21, 2011.
Communication in EP 05712005.7, mailed Apr. 28, 2009.
Communication in EP 03726210.2, mailed Dec. 3, 2009.
International Search Report of PCT/US06/42430, dated Dec. 21, 2007.
Third Party Submission in U.S. Appl. No. 10/961,404, dated May 3, 2007.
Third Party Submission in U.S. Appl. No. 10/961,404, dated Oct. 4, 2005, by Matson.
Third Party Submission in U.S. Appl. No. 10/961,404, dated Oct. 4, 2005, by Hemenway.
Asness, Clifford S., "Non-Cap Weighted Indexes, " the Q-Group Spring 2007 Seminar, Mar. 25-28, 2007 AQR Capital Management, LLC.
Wood et al., "Fundamental Profit Based Equity Indexation: A Better Way to Hold the Market," 5 pages, Second Quarter 2003 (at http://www.journalofindexes.com).
Author Unknown, "Registration Statement for iShares (R) Trust," pp. 1, 2, 4, 5, 8, 14, 15 of 67, Aug. 18, 2003 (at http://www.sec.gov/Archives/edgar/data/).
Author Unknown, "Dow Jones Indexes to Launch Dividend Index," 2 pages, Oct. 30, 2003 (at http://www.dowjones.com/cgi-bin).
Author Unknown, "Dow Jones Indexes: Dow Jones Select Dividend Index Summary," 5 pages, at least as early as Sep. 30, 2003.
Arnott et al., "Fundamental Indexation," Financial Analysts Journal, vol. 61, No. 2, pp. 83 and 98, Mar./Apr. 2005 (at www.cfapubs.org).
Block, Sandra, "Stock Funds to Go Gourmet to Beat Index," USA Today, Section Money, 2 pages, Mar. 3, 1997.
Author Unknown, "MSCI Press Release: MSCI Develops Enhanced Methodology for its Global Value and Growth Indices," 2 pages, Sep. 25, 2002 (at http://www.msci.com).
Fama, Eugene, Jr., "The New Indexing," 2 pages, Jul. 2000 (at http://www.dfaus.com/).
Arnott et al., "Surprise! Higher Dividends=Higher Earnings Growth," Financial Analysts Journal, pp. 70-72, and 82, Jan./Feb. 2003.
Author Unknown, "CME: Goldman Sachs Commodity Index (GSCI)revises commodity weights for 2003," 1 page, Nov. 6, 2002.
Buffett, Warren, Letter to Berkshire Hathaway, Inc. Shareholders, pp. 3, 16, and 19, at least as early at 1999.
Notice of Preliminary Rejection in KIPO 10-2006-7017949.
Office Action from U.S. Appl. No. 12/619,668 mailed Feb. 13, 2012.
Exam Report from New Zealand NZ593108 mailed May 31, 2011.
Exam Report in Australia AU2005213293 mailed Aug. 5, 2010.
Canadian Office Action from CA 2,481,506 mailed Feb. 8, 2012.
"ActiveBeta Strategies," Westpeak Global Advisors, L.P., Dec. 15, 2009.
"Portable Alpha: Is a Hedge Fund Index-based Alpha Overlay the Most Appropriate Solution?" Werner Goricki, Dirk Soehnholz, Marcus Storr, Vincent Weber, Jun. 2006.
Notice of Rejection in JP Patent Application No. 2008-547223.
Shigeki Sakakibara, *Shoken Toshi-ron* [Financial Investment Theory], Japan, Nikkei, Apr. 24, 1998, 3rd Edition, pp. 200-201.
Exam Report(GCC/SIPO/637) dated Jan. 19 and 20, 2012 from SIPO Application GCC/CN2011/000412 prepared for GCC Patent Application No. GCC/P/2008/10433.
Office Action in U.S. Appl. No. 12/554,961, dated Dec. 12, 2011.
Office Action in U.S. Appl. No. 12/819,199, dated Feb. 16, 2012.
Salzinger, Mark, "Interview : Jason Hsu," The Investor's ETF Report, Jan., 2007.
David Hoffman, "Weightings Ignoring Market Caps Gain In Popularity," Pension&Investments Online, Feb. 19, 2007.
Eric Uhlfelder, "Challengine EAFE: Managers Who Closely Track Market-Cap-Weighted Country Indexes May Miss Opportunities," Financial Advisor Magazine, Mar. 1, 2007.
Eugene F. Fama, Kenneth R. French, "Staight Talk: Nouveau Indexes, Noise and the Nonsense of Active Management," Journal of Indexes, Mar./Apr. 2007.
Charles Leary, "The Harsh Light of Day," Index Universe.com, Mar. 8, 2007.
Jason IIsu, Jason Chia-Shang Tuan, "Indexing for an inefficient market," IPA, Apr. 1, 2007.
Peter A. McKay, "North Dakota Considers Research Affliates," Money Management Letter, Apr. 23, 2007.
Douglas Appell, "Disputing the superiority of fundamental indexing," Investment News, May 7, 2007.
Heather Bell, "News Briefs: Analysts wary of fundamental indexes," Pension&Investments Online, May 14, 2007.
Martha Brill, "The age of investment strategy indices (Roundtable Discussion)," Global Pensions, Jun. 1, 2007.
David Williams, "What another 5% on top? (Interview with Paul Stewart)," Business Day, Jun. 7, 2007.
Sophia Grene, "Dilsaver Reveals Schwab Funds' Biggest Secret," MutuallFundWire.com, Jun. 7, 2007.
Maureen Darrigo, "PowerShares to Launch Four International ETFs Based on FTSE RAFT™ Indexes at the New York Stock Exchange Jun. 25, 2007," Press Release, Jun. 19, 2007.
Jonathan Chevreau, "PowerShares Launches Four New FTSE RAFI™ International ETFs on NYSE Area," Press Release, Jun. 25, 2007.
Jonathan Chevreau, "Hirings: AssetMark Investment Services," Pension&Investments Online, Jun. 25, 2007.

Jonathan Chevrear, "PowerShares Expand Its Global ETF Initiative Strategy at NYSE," Press Release, Jun. 25, 2007.
Matthew Hougan, "ETF Watch: Jun. 7-25," Index Universe.com, Jun. 27, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Ju. 5, 2007.
Trang Ho, "Foreign ETF Assets Up 24% So Far This Year," Investor's Business Daily, Jul. 11, 2007.
Bernard, Victor et al., "Accounting-Based Stock Price Anomalies: Separating Market Inefficiencies from Risk*," 1996 Contemporary Accounting Research Conference, Sep. 1996, pp. 1-57.
Bergstresser, Daniel, et al., "Investment Taxation and Portfolio Performance*," Preliminary Draft, Boston College Finance Wednesday Seminar and the 2006 UNC Tax Symposium, Apr. 12, 2006.
Author Unknown, "Separately Managed Accounts to Become Dominant Vehicle for Individual Securities," Tower Group Research, www.advisorpage.com/modules, Adverisor Page, Competitive Intelligence, Feb. 6, 2008.
Hemminki, Julius et al., "Fundamental Indexation in Europe," Journal of Asset Management, vol. 8, 6, pp. 401-405, www.palgrave-journals.com/jam. Oct. 26, 2007.
Author Unknown, "MSCI To Adjust for Free Float and to Increase Coverage to 85%," MSCI Press Release, www.msci.com. Geneva, Dec. 10, 2000, pp. 1-3.
Chance, Don M., "Six One Way, Half-A-Dozen The Other," www.indexuniverse.com/component/content/article/4035, Trading Places, May/Jun. 2008.
Brock, Woody, The Role of Pricing Model Uncertainty,:—Resolving Four Paradoxes in Today's Market Behavior, Strategic Economic Decisions, SED Profile May 2008.
Author Unknown, "The Role of Pricing Model Uncertainty"—Resolving Four Paradoxes in Today's Market Behavior,-Strategic Economic Decisions, www.SEDinc.com, SED Profile, May 2008.
Author Unknown, "America's Fastest Growing Companies Total Growth Index," America's Fastest Growing Companies Jan. 2002.
Author Unknown, "CalPERS Goes Fundamental," News, Indexing Developments, Journal of Indexes, May/Jun. 2006, p. 52.
Arnott, Robert D., "What Cost "Noise"?" Financial Analysts Journal, Editor's Corner, CFA Institute, Mar./Apr. 2005, pp. 10-14.

* cited by examiner

USING ACCOUNTING DATA BASED INDEXING TO CREATE A PORTFOLIO OF ASSETS

Matter enclosed in heavy brackets [ ] appears in the original patent but forms no part of this reissue specification; matter printed in italics indicates the additions made by reissue.

CROSS-REFERENCE TO RELATED APPLICATION

The present application claims the benefit of U.S. Patent Application No. 60/751,212, Confirmation No. 7679, filed Dec. 19, 2005 previously entitled "Using a Fundamental Index to Create a Portfolio of Assets," entitled "Using Accounting Data Based Indexing to Create a Portfolio of Assets" to Robert D. Arnott, of common assignee to the present invention, the contents of which are incorporated herein by reference in their entirety.

The present application also claims the benefit of and is also a continuation-in-part of U.S. patent application Ser. No. 11/196,509, filed Aug. 4, 2005 *now U.S. Pat. No. 7,620,577*, which is a continuation-in-part of U.S. patent application Ser. No. 10/961,404, entitled "Non-Capitalization Weighted Fundamental Indexing System, Method and Computer Program Product," to Arnott, filed Oct. 12, 2004 *now U.S. Pat. No. 7,792,719*, (which claims the benefit of U.S. Provisional Patent Application No. 60/541,733, entitled "Securities Indexing," to Arnott, and U.S. patent application Ser. No. 10/159,610, entitled "Fundamental Stock Market Index and Index Fund or Funds," filed Jun. 3, 2002 *now abandoned*, all of which are of common assignee to the present invention, and all of the contents of which are incorporated herein by reference in their entireties.

BACKGROUND OF THE INVENTION

1. Field of the Invention

The present invention relates generally to securities investing, and more particularly to construction and use of indexes and portfolios based on indexes.

2. Related Art

Conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Advantages of passive investing include: a low trading cost of maintaining a portfolio that has turnover only when an index is reconstituted, typically once a year; a low management cost of a portfolio that requires no analysis of individual securities; and no chance of the portfolio suffering a loss—relative to the market or market segment the index reflects—because of misjudgments in individual securities selection.

Advantages of using market capitalization weighting as the basis for a passive portfolio include that the index (and there fore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index finds, or investors who desire their funds to closely track an index, are compelled to have a higher weighting in companies whose share prices or market capitalizations have already risen and a lower weighting in companies that have seen a decline in their share price or market capitalization.

Price or market capitalization based indices can contribute to a 'herding' behavior on the behalf of investors by effectively compelling any of the funds that attempt to follow these indices to have a larger weighting in shares as their price goes up and a lower weighting in shares that have declined in price. This creates unnecessary volatility, which is not in the interests of most investors, It may also lead to investment returns that have had to absorb the phenomenon of having to repeatedly increase weightings in shares after they have risen and reduce weightings in them after they have fallen.

Capitalization-weighted indexes ("cap-weighted indexes") dominate the investment industry today, with approximately $2 trillion currently invested. Unfortunately, cap-weighted indexes suffer from an inherent flaw as they overweight all overvalued stocks and underweight all undervalued stocks. This causes cap-weighted indexes to underperform relative to indexes that are immune to this shortcoming. In addition, cap-weighted indexes are vulnerable to speculative bubbles and emotional bear markets which may unnaturally drive up or down stock prices respectively.

It is a well established empirical conclusion of investment theory that cap-weighting is not mean-variance optimal. This conclusion holds because weighting schemes based on market price, including cap-weighting, overweight 100% of overvalued stocks and underweight 100% of undervalued stocks. Both mathematically and empirically, this over and under weighting problem inherent to cap-weighting leads to a return drag of 200 bps per year in the U.S. and more than 200 bps per year internationally.

One example of the phenomenon comes from the recent stock market bubble of 1997-2000, when, e.g., Internet network service provider Cisco comprised nearly 5% of the S&P 500. At its peak in 2000, Cisco traded at $70 per share. Since March 2000, Cisco has fallen to approximately 12% of its peak, dragging down S&P 500 performance of which it comprised 5%.

While it is difficult or impossible to know the true fair value of a company, what is known is that if an overvalued company's weight in an index is determined by market capitalization, then the company will be over-weighted in the index. Conversely, if a company's weight is determined by market capitalization and it is undervalued, it will be underweighted in a capitalization-weighted index.

Over the past 40 years, the largest stock by market capitalization in the S&P 500 has underperformed the average stock in the index over a 10-year time period by an average of 40%. The largest 10 stocks by market capitalization have underperformed the average stock over the subsequent 10-year time frame by an average of 26%. Yet, cap-weighted indexes continue to invest 20-30% of their value in the largest 10 stocks by market cap, despite the fact that they underperform the average stock in the index, because the stocks are selected and weighted using market capitalization, which by its nature over-weights over valued stocks and under-weights undervalued stocks.

Equal-weighted indexation is a popular alternative to cap-weighting but one that suffers from its own shortcomings. One significant problem with equal-weighted indexes is that they come out of the same cap-weighted universes as cap-weighted indexes. For example, the S&P Equal Weighted Index simply re-weights the 500 equities that comprise the S&P 500, retaining the bias already inherent to cap-weighted indexes.

High turnover and associated high costs are additional problems of equal-weighted indexes. Equal-weighted indexes include small illiquid stocks, which are required to be held in equal proportion to the larger, more liquid stocks in the index. These small illiquid stocks must be traded as often as the larger stocks but at a higher cost because they are less liquid.

What is needed then is an improved method of weighting financial objects in a portfolio based on an index that overcomes shortcomings of conventional solutions.

SUMMARY OF THE INVENTION

In an exemplary embodiment of the present invention a system, method and computer program product for index construction and/or portfolio weighting is disclosed.

Exemplary embodiments of the present invention may use accounting data based indexing, i.e., accounting data based measures of firm size, rather than market capitalization, to construct a stock index. By avoiding the inherent valuation bias of cap-weighted indexes, accounting data based indexes (ADBI) may outperform cap-weighted indexes by as much as 200 bps in the US and by more than 250 bps internationally, based on extensive back testing (to 1962 in the US and to 1988 internationally).

An exemplary embodiment may use four specific metrics in ADBI construction: book equity value; income (free cash flow); sales; and gross dividends. An ADBI construction strategy may offer several advantages. For example, ADBI may outperform cap-weighted indexes. Additionally, ADBI may be adaptable to distinct strategies. ADBI may be used to construct either large or small company indexes, industry sector indexes, geographic indexes and others. ADBI may also effectively limit portfolio risk by providing the benefits of traditional cap-weighted indexes, including diversification, broad market participation, liquidity and low turnover, while generating incrementally higher returns with somewhat lower volatility than comparable cap-weighted indexes. ADBI may also provide protection against market bubbles and fads because a stock's weight in the index is immune to errors in stock valuation.

In an exemplary embodiment, the present invention may be a method of constructing a portfolio of financial objects, including the steps of: purchasing a portfolio of a plurality of mimicking financial objects to obtain and/or create a mimicking portfolio, where performance of the portfolio of mimicking financial objects substantially mirrors the performance of an accounting data based index based portfolio without substantially replicating the accounting data based index based portfolio.

The embodiment may further include: obtaining and/or using a risk model for the portfolio of mimicking financial objects, where the risk model mirrors a risk model of the accounting data based index.

The performance of the portfolio of mimicking financial objects may substantially mirror the performance of the accounting data based index based portfolio without substantially replicating financial objects and/or weightings in the accounting data based index based portfolio. The risk model may be substantially similar to the Fama-French factors, where the Fama-French factors may include at least one of size effect, value effect, and/or momentum effect.

A financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call: an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

In another exemplary embodiment, the present invention may be a method of constructing a portfolio of financial objects, including the steps of: purchasing a plurality of financial objects according to weightings substantially similar to the weightings of an accounting data based index, where performance of the plurality of financial objects substantially mirrors the performance of the accounting data based index without using substantially the same financial objects in the accounting data based index.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

In another exemplary embodiment, the present invention may be a method of constructing a portfolio of financial objects, including the steps of: determining overlapping financial objects appearing in both an accounting data based index (ADBI) and a conventional weighted index, where the conventionally weighted index may includes an index weighted based on at least one of capitalization, equal weighting, and/or share price weighting, and where the ADBI may includes weighting based on at least one accounting data based factor and not based on any of capitalization, equal weighting, and/or share price weighting index; comparing weightings of the overlapping financial objects in the ADBI with weightings of the overlapping financial objects in the conventionally weighted index; and purchasing at least one financial object based on the comparing.

The purchasing may include at least one of: purchasing a long position in at least one overlapping financial object when the comparing indicates the at least one overlapping financial object is over weighted in the non-capitalization weighted index relative to the conventional index; and/or purchasing a short position in at least one overlapping financial object when the comparing indicates the at least one overlapping financial object is underweighted in the non-capitalization weighted index relative to the conventional index.

The purchasing of the long and/or short positions may be implemented by using total return swaps. The long and/or short positions may be held for one year.

The embodiment may further include rebalancing the portfolio. The rebalancing may include: at least one of creating new long and/or short positions using cash flow from new capital contributions, and/or altering existing long and/or short positions using cash flow from new capital contributions.

The embodiment may further include using leverage to obtain the long and/or short positions.

The comparing may include calculating a difference between the weightings, and/or calculating a difference between arithmetically modified values of the weightings. The arithmetically modified values of the weightings may include square roots of the weightings.

The comparing may include calculating a difference based on tiers of weightings using stratified sampling.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, closed end fund, an investment vehicle, and/or any other pooled and/or separately managed investments.

In another exemplary embodiment, the present invention may be a method of constructing a portfolio of financial objects, including the steps of: determining non-overlapping financial objects appearing in only one of either an accounting data based index (ADBI) or a conventional weighted index by comparing financial objects in an ADBI with financial objects in a conventionally weighted index, where the conventionally weighted index may includes conventionally weighting based on at least one of capitalization, equal weighting, and/or share price weighting, and where the ADBI may includes accounting data based weighting on at least one accounting data based factor and not based on any of capitalization, equal weighting, and/or share price weighting index; weighting the non-overlapping financial objects appearing only in the ADBI by accounting data based weighting; weighting the non-overlapping financial objects appearing only in the conventionally weighted index by the conventional weighting; and purchasing financial objects based on the weightings.

The accounting data based weighting may include: (a) gathering data about a plurality of financial objects; (b) selecting a plurality of financial objects to create an index of financial objects; and (c) weighting each of the plurality of financial objects selected in the index based on an objective measure of scale based on accounting data of a company associated with each of the plurality of financial objects, where the weighting may include: (i) weighting at least one of the plurality of financial objects based on accounting data;

and (ii) weighting other than weighting based on at least one of market capitalization, equal weighting, and/or share price weighting.

The embodiment may further include weighting each of the plurality of financial objects, where the each of the financial objects may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, closed end fund, an investment vehicle, and/or any other pooled and/or separately managed investments.

The embodiment may further include weighting each of the plurality of financial objects, where the each of the financial objects may include a stock.

The objective measures of scale may include weighting based on any dividends, book value, cash flow, and/or revenue. The embodiment may further include equally weighting each objective measure of scale.

The embodiment may further include weighting based on the objective measure of scale, where the objective measure of scale may include a measure of company size associated with each of the plurality of financial objects.

The measure of company size may include at least one of: inventory, revenue, sales, income, book income, taxable income, earnings growth rate, earnings before interest and tax (EBIT), earnings before interest, taxes, depreciation and amortization (EBITDA), retainer earnings, number of employees, capital expenditures, salaries, book value, assets, fixed assets, current assets, quality of assets, operating assets, intangible assets, dividends, gross dividends, [dividend yields,] cash flow, liabilities, losses, long term liabilities, short term liabilities, liquidity, long term debt, short term debt, bonds, corporate bonds, net worth, shareholder equity, goodwill, research and development expenditures, costs, cost of goods sold (COGS), and/or research and development costs.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

In another exemplary embodiment, the present invention may be a method, executed on a data processing system, including the steps of: creating an accounting data based index (ADBI) based on accounting data including: selecting a universe of financial objects, and selecting a subset of the universe based on the accounting data to obtain the ADBI; creating a portfolio of financial objects using the ADBI, including weighting the financial objects in the portfolio according to a measure of value of a company associated with each financial object in the portfolio.

The universe may include at least one of: a sector; a market; a market sector; an industry sector; a geographic sector; an international sector; a sub-industry sector; a government issue; and/or a tax exempt financial object.

The accounting based data used in weighting as a measure of value of the company associated with the financial object, may include at least one of: any dividends; revenue; cash flow; and/or book value.

The accounting based data may be weighted relatively dependent on the geography of the company associated with the financial object.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

In another exemplary embodiment, the present invention may be a computer-implemented method for construction and management of an index and at least one index fund containing a portfolio of financial objects based on the index, where weighting of the index is based on accounting based data rather than on stock prices or market capitalization or equal weighting, the computer-implemented method including the steps of creating an index, and at least one index fund containing a portfolio of financial objects, where the constituent weightings of the companies issuing the financial objects in the index fund are based upon accounting based data regarding the companies associated with the financial objects, where the accounting based data may includes any dividends, cash flow, revenues, and/or book value.

The embodiment may further include: creating the index, and the at least one index fund containing a portfolio of financial objects where the constituent weightings are based upon any ratio of accounting based data, or any manipulation of accounting based data, that is contained within a standard company annual report and accounts.

The embodiment may further include: creating the index, and the at least one index fund containing a portfolio of financial objects where the constituent weightings are based upon any ratio of accounting based data per share, or any manipulation of accounting based data, that is contained within a standard company annual report and accounts.

The embodiment may further include: managing an accounting based data index, and at least one index fund containing a portfolio of financial objects based on the index including: altering the relative weightings of the financial objects within the at least one index fund as the accounting based data concerning the companies associated with the financial objects changes.

The altering may include at least one of: altering based on at least one of: changes in relative weightings of financial objects in the index; and/or changes in the financial objects that are members of the index outside the sample changes; and/or altering at the time of at least one of when, and/or after at least one company associated with a financial object of the index reports its accounting information.

The financial object may include: at least one unit of interest in at least one of: an asset; a liability; a tracking portfolio; a financial instrument and/or a security, where the financial instrument and/or the security denotes a debt, an equity interest, and/or a hybrid; a derivatives contract, including at least one of; a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity of any kind, including an interest in, or rights relating to: a hedge fund, an exchange traded fund (ETF), a fund of funds, a mutual fund, an investment vehicle, and/or any other pooled and/or separately managed investments.

The measure of company size may include at least one of: a financial ratio of a company; a ratio of accounting based data; a ratio of accounting based data per share; a ratio of a first accounting based data to a second accounting based data; a liquidity ratio; a working capital ratio; a current ratio; a quick ratio; a cash ratio; an asset turnover ratio; a receivables turnover ratio; an average collection period ratio; an average collection period ratio; an inventory turnover ratio: an inventory period ratio; a leverage ratio; a debt ratio; a debt-to-equity ratio; an interest coverage ratio; a profitability ratio; a return on common equity (ROCE) ratio; profit margin ratio; an earnings per share (EPS) ratio; a gross profit margin ratio; a return on assets ratio; a return on equity ratio; a dividend policy ratio; [a dividend yield ratio;] *and/or* a payout ratio[; a capital market analysis ratio; a price to earnings (PE) ratio; and/or a market to book ratio].

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EMBODIMENTS OF THE PRESENT INVENTION

Figure 1:
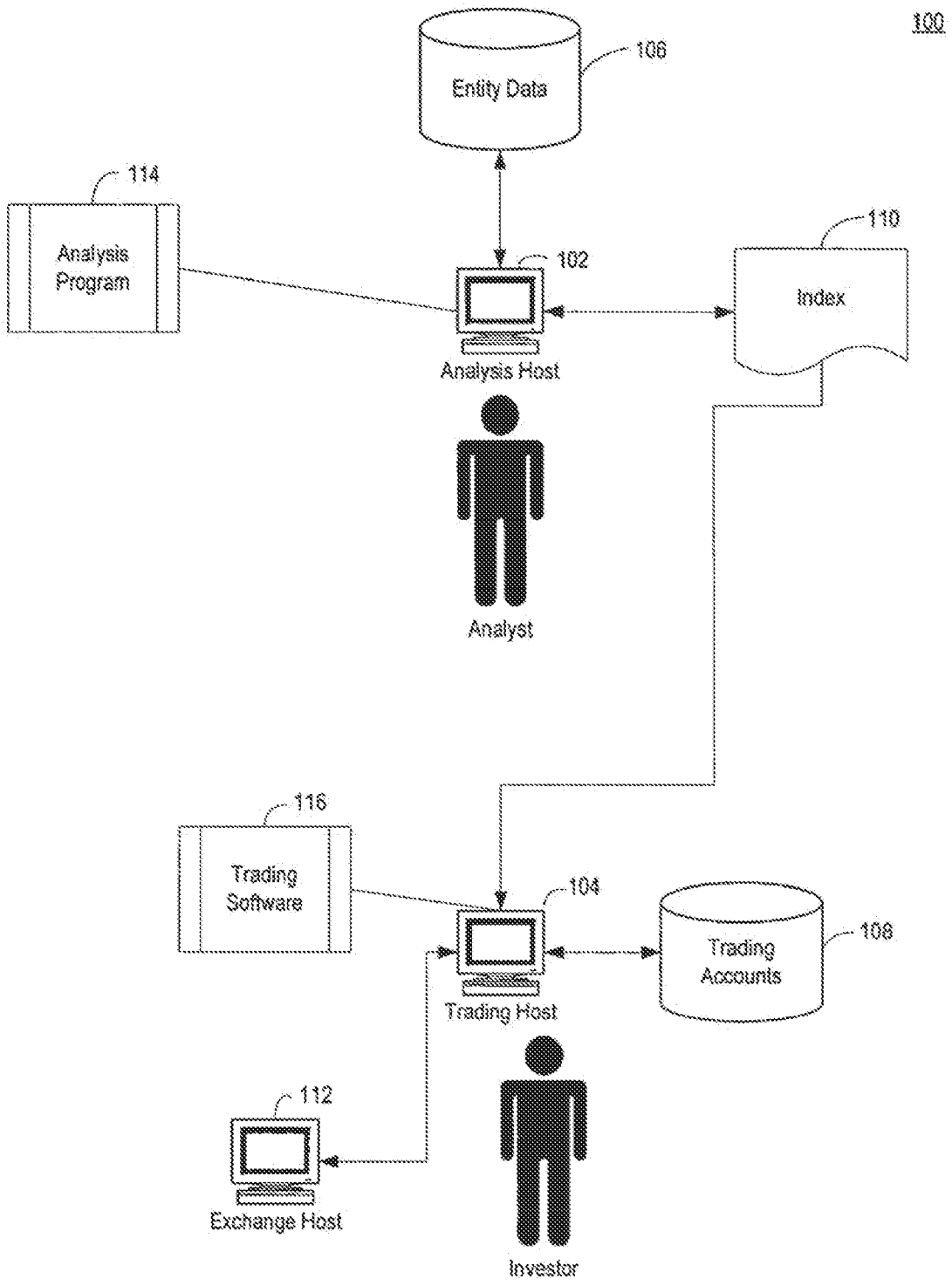
FIG. 1 is a deployment diagram of an index generation and use process in accordance with an exemplary embodiment of the present invention.

Various exemplary embodiments of the invention are discussed in detail below including a preferred embodiment. While specific implementations are discussed, it should be understood that this is done for illustration purposes only. A person skilled in the relevant art can recognize that other components, configurations, accounting data, and ratios may be used without parting from the spirit and scope of the invention.

An exemplary embodiment of the invention may be implemented on a computing device(s), processor(s), computer(s) and/or communications device(s).

The computer, in an exemplary embodiment, may comprise one or more central processing units (CPUs) or processors, which may be coupled to a bus. The processor may, e.g., access main memory via the bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, a floppy diskette or flash drive, etc. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to, a removable storage drive, a hard disk installed in hard disk drive, and signals, etc. These computer program products may provide software to the computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Constructing Accounting Data Based Indexes

A financial object, as discussed herein, may include at least one unit of interest in an asset; a liability; a tracking portfolio; and/or a financial instrument and/or a security, where the financial instrument and/or security denotes a debt, an equity interest, and/or a hybrid. A financial object, as discussed herein, may also include at least one unit of interest in a derivatives contract, including but not limited to at least one of: a future, a forward, a put, a call, an option, a swap, or other financial instrument whose price is derived from the price of the underlying financial asset, and/or any other transaction relating to a fluctuation of an underlying asset, notwithstanding the prevailing value of the contract, and notwithstanding whether such contract, for purposes of accounting, is considered an asset or liability. A financial object, as discussed herein, may also include at least one unit of interest in a fund; and/or in an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

FIG. 1 depicts an exemplary deployment diagram 100 of an index generation and use process in accordance with an exemplary embodiment of the present invention. According to the exemplary embodiment, an analyst may use a computer system 102 to generate an index 110. The analyst may do so by using analysis software 114 to examine data 106 about entities offering different kinds of financial objects that may be traded by investors. An example of an entity that may be offering financial objects may be a publicly held company whose shares trade on an exchange. However, the present invention also applies to any entity that may have any type of financial object that may be traded where information about the entity and/or its financial objects is available (or capable of being made available) for analysis.

In an exemplary embodiment, once index 110 has been generated by an analyst using the entity data 106, index 110 may be used to build investment portfolios. An investor, advisor, manager or broker may then manage the purchased financial objects as a mutual fund, an electronic traded fund, a hedge fund or other portfolio or account of assets for one or for a plurality of individual and/or institutional investors. The investor, advisor, manager or broker may use a trading computer 104 with trading software 116 to manage one or more trading accounts 108. Alternatively, the purchased financial objects may be managed for one or more investors. In the latter case, financial objects may be purchased based on the index for inclusion in an individual or an institutional investor's portfolio. One or more trades may be effected or closed in cooperation with and via communication with an exchange host 112.

Figure 2:
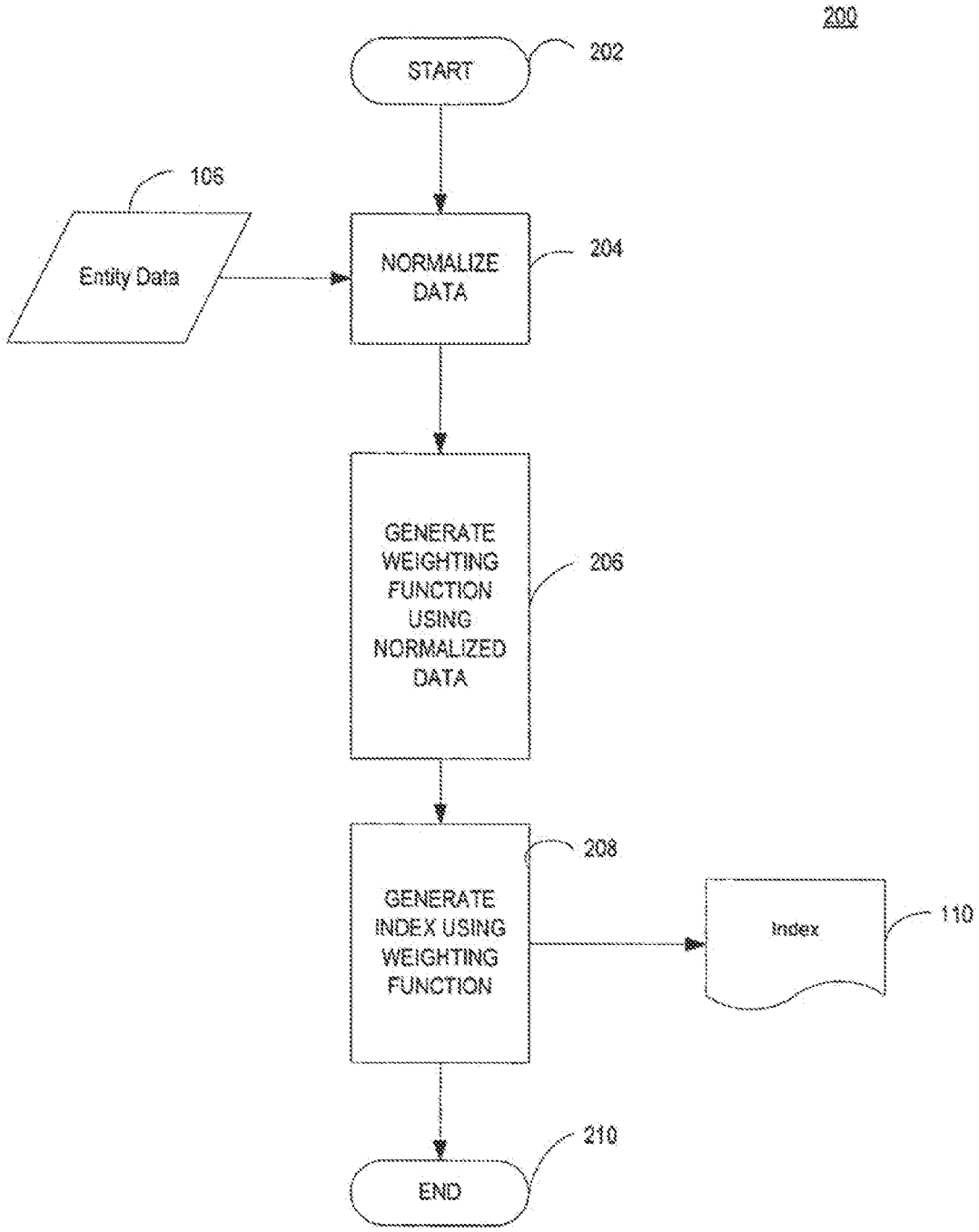
FIG. 2 is a process flow diagram of an index generation process in accordance with an exemplary embodiment of the present invention.

FIG. 2 depicts an exemplary process flow diagram 200 of an index generation process in accordance with an exemplary embodiment of the present invention. In an exemplary embodiment, starting at block 202, to generate index 110, an analyst using analysis software 114 may access entity data 106 about various entities that have financial objects that are traded. For example, publicly traded companies must disclose information about certain financial aspects of their operations. This information may be aggregated for a plurality of entities. Market sectors and corresponding indices may then be identified and generated using the aggregate data.

In slightly more detail, an index 110 may be generated by normalizing entity data for a particular non-market capitalization metric in block 204. The normalized entity data may be used to generate a weighting function, in block 206, describing the contribution of each entity to a business sector as defined by the metric, in an exemplary embodiment. Index 110 may be generated using the weighting function in block 208. The process ends at block 210. Once index 110 is generated, according to an exemplary embodiment, index 110 may be used to track the business sector defined by the metric or to create a portfolio of financial objects offered by the entities whose information was used to generate the index.

For example, in an exemplary embodiment of the invention a method of constructing a non-capitalization weighted portfolio of financial objects may include, e.g., gathering data about various financial objects; selecting a group of financial objects to create the index of financial objects; and weighting each of the group of financial objects selected in the index based on an objective measure of scale of each member of the group of financial objects, where the weighting may include weighting all or a subset of the group of financial objects, and weighting based on other than market capitalization, equal weighting, or share price weighting.

In one exemplary embodiment, the weighting of each member of the group of financial objects, may include weighting financial objects of any of various types. Examples of various types of financial objects may include, e.g., but not limited to, a stock type; a commodity type; a futures contract type; a bond type; a mutual fund type; a hedge fund type; a fund of funds type; an exchange traded fund (ETF) type; a derivative type asset, and any other portfolio or account of financial objects. The weighting may also include, e.g., but not limited to, a negative weighting on any of the various types of financial objects.

According to exemplary embodiments of the present invention, the index 110 may be weighted based on an objective measure of scale, where the objective measure of scale may include a measure relating to an underlying asset itself. The financial object may include a municipality, a municipality issuing bonds, or a commodity. An objective measure of scale associated with the financial object may include any combination or ratios of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, dividends, dividends per share, [dividend yields,] tax rate, liquidation value of company, capitalization of cash, capitalization of earnings, capitalization of revenue, cash flow, and/or future value of expected cash flow.

Ratios too may be used. In an exemplary embodiment, the weighting of financial objects in the index based on objective measures of scale may include a ratio of any combination of the objective measures of scale of the financial object other than ratios based on weighting the financial objects based on market capitalization, equal weighting, or share price weighting. For example, the ratio of any combination of the objective measures of scale may include, e.g., but not limited to, current ratio, debt ratio, overhead expense as a percent of sales, or debt service burden ratio.

In an exemplary embodiment, the portfolio of financial objects may include, e.g., but not limited to, one or more of, a fund; a mutual fund; a fund of funds; an asset account; an exchange traded fund (ETF); a separate account, a pooled trust; a limited partnership or other legal entity, fund or account.

In an exemplary embodiment, a measure of company size may include one of, or a combination of one or more of, gross revenue, sales, income, earnings before interest and tax (EBIT), earnings before interest, taxes, depreciation and amortization (EBITDA), number of employees, book value, assets, liabilities, net worth, cash flow or dividends.

In one exemplary embodiment, the measure of company size may include a demographic measure of the financial object. The demographic measure of the financial object may include, e.g., one of, or any combination of one or more of a non-financial metric, a non-market related metric, a number of employees, floor space, office space, or other demographics of the financial object.

In an exemplary embodiment, weighting may be based on the objective measure of scale, where the measure may include a geographic metric. The geographic metric in an exemplary embodiment may include a geographic metric other than gross domestic product (GDP) weighting.

Figure 3:
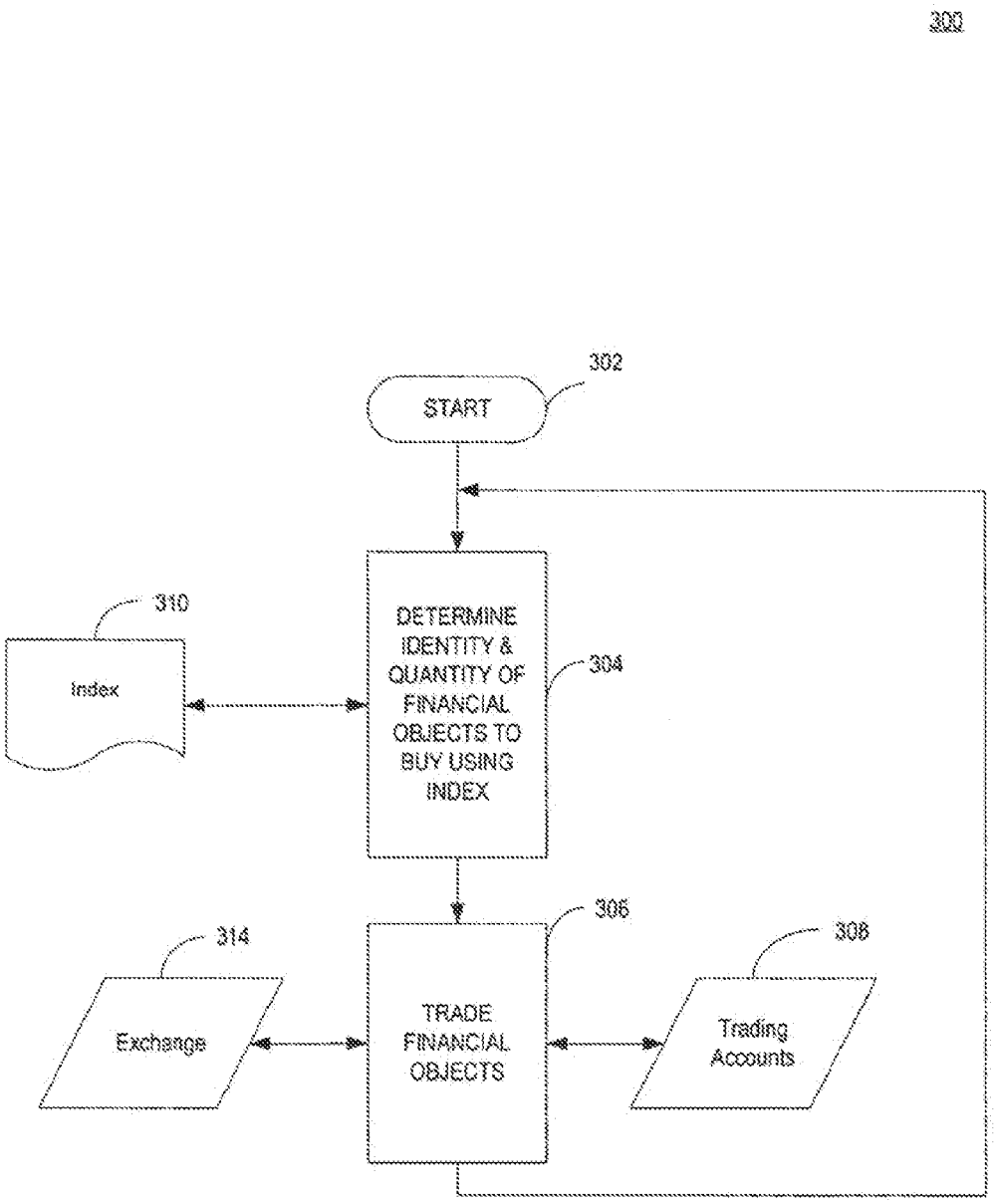
FIG. 3 is a process flow diagram of an index use process in accordance with an exemplary embodiment of the present invention.

FIG. 3 depicts an exemplary process flow diagram 300 of an index use process in accordance with an exemplary embodiment of the present invention. The process starts at block 302. An index 310 may be received from an index generation process and may be used to determine the identity and quantity of securities to purchase for a portfolio in block 304, according to an exemplary embodiment. The securities may be purchased, in block 306, from an exchange 314 or other market and may be held on account fur an investor or group of investors in trading accounts 308. The index 310 may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on financial objects reaching a threshold condition or value. For example, but not limited to, rebalancing may occur upon reaching a threshold such as, e.g., 'when the portfolio of financial objects increases in market value by 20%,' or 'when the financial objects on a sub-category within the portfolio exceed 32% of the size of the portfolio,' or 'when a U.S. President is elected from a different party than the incumbent,' etc. Rebalancing may take place periodically, e.g., quarterly, or annually.

The present invention, in an exemplary embodiment, may be used for investment management, or investment portfolio benchmarking.

Another exemplary embodiment of the present invention may include an Accounting Data Based Index (ADBI) such as, e.g., but not limited to, a FUNDAMENTAL INDEX™ and Index Fund or Funds.

This exemplary embodiment may utilize a new series of accounting data based stock market indices in which the index weightings may be determined by company accounting data such as, e.g., but not limited to, the relative size of a company's profits, or its pre-exceptional profits, or sales, or return on investment or any accounting data based accounting item, or ratio, may help to address some of the issues raised above. An index that is weighted based on company accounting data, rather than the share price, or market capitalization or equal weighting, may have a stabilizing element within it that can help to remove excess volatility generated by indices constructed on the basis of price or market capitalization alone. Over the medium to longer term, such accounting data based indices have the potential to outperform price or market capitalization-based indices, and may do so with less volatility.

The exemplary inventive method may create a new class of stock market indices and index funds that may be implemented on, e.g., but not limited to, a computing device or a processor, or as a computer software or hardware, or as an algorithm. This new class of stock market indices may base its weightings on the accounting data of the companies that make up that index. One possible version of an accounting data based stock market index may be an index that is based on the relative size of a sample of the companies' pre-exceptional profits. If the chosen sample of companies was determined to be one hundred and the accounting data based criteria that the index manager decided to use was to be 'largest pre-exceptional profits,' then the index may contain, e.g., the one hundred largest companies as defined by the size of their pre-exceptional profits. As an example, if the total pre-exceptional profits of the largest one hundred companies, as measured by their pre-exceptional profits, was 100 dollars, pound, or other currency, in a defined time period (such as a quarter or year) and in the same time period the pre-exceptional profits of theoretical company 'A' were $2, then theoretical company A would be allocated a 2% weighting in the accounting data based index, in an exemplary embodiment. If theoretical company B had pre-exceptional profits of $1.5 in over the same time period then it would have a weighting of 1.5% in the accounting data based index according to an exemplary embodiment.

The index weightings may be managed based on how the fundamentals of the companies within, or outside, the chosen index sample may change. As an example, the index manager could choose to rebalance the weightings from time to time such as, e.g., but not limited to, periodically, aperiodically, quarterly, as company pre-exceptional profits change, and/or on an annual basis, etc., and enter their choice into, e.g., a computing device. If, for instance, by the time of the next rebalancing period the total pre-exceptional profits of the largest one hundred companies, as measured by their pre-exceptional profits, had grown to $120, and theoretical company A now had pre-exceptional profits of $1.2, the computing device may calculate the weighting of company in the accounting data based index such as, e.g., the accounting data based index down to 1% from 2% in the previous period. Creating such accounting data based indices may give an investor the opportunity to follow, or invest, passively in an index which may be anchored to the economic realities of the companies within it. This new accounting data based index construction technique by a computing device may produce an index and related index fund products with increased stability and with increased economically rational behavior as compared with known methods of investing.

Accounting Data Based Indexation

In one exemplary embodiment, a computing device may create an accounting data based stock market index (ADBI) such as, e.g., an accounting data based stock market index by using any of the accounting data based data points regarding a company or a group of companies that can be found in a company's annual report and accounts. In one exemplary embodiment, the computing device may create an index of companies based on the relative size of the companies' sales, assets, profits, cash flow or the shareholders equity. In addition, the computing device can also create the ADBI by using a ratio of any of the data concerning a company or group of companies that may be contained in a company report and accounts. In one exemplary embodiment, this could include the relative size of the return on financial objects of a selection of companies, their return on investment, or their return on capital compared to their cost of capital.

Once the index manager has decided and entered which accounting data based criteria to use and how many constituents the manager may decide that he or she wants to include in the index, the computing device may create the index in the following way. If, for example, the index manager decides to construct an accounting data based stock market index of one hundred constituent members and decides to use pre-exceptional profit as the chosen accounting data based criteria, the computing device may create the index as follows. First, the computing device may perform a search to find which are the largest one hundred listed companies as defined by the size of their pre-exceptional profits. Once the computing device has identified this information, the computing device may be ready to construct the index. Companies may be accorded index weightings based on the relative size of their pre-exceptional profits. If the combined pre-exceptional profits of the one hundred companies is $100 and theoretical company A has pre-exceptional profits of $2, then it may have an index weighting of 2%. Once the one hundred companies may have been accorded their weightings, the computing device may begin to calculate future index performance as the share prices of the different companies in the index changes from day to day. This may be achieved by assuming a starting value for the index, or index portfolio, and then calculating how each of the index constituents may perform going forward.

The computing device may then rebalance the index weightings as the accounting data based data points change over time as desired by the investor. For instance, if at the end of the next company reporting season the combined pre-exceptional profits of the one hundred largest companies had grown from $100 to $120 and the pre-exceptional profits of theoretical company A had declined from $2 to $1.2, the computing device may determine its weighting in the index would decline from 2% in the prior period to 1% in the current period. Also, some of the original companies in the first one hundred may be eliminated from the index if their pre-exceptional profits fall below a certain level while new companies that were not in the original sample may be included. The computing device, under the direction of an investor, may choose to rebalance the weightings in the index, e.g., but not limited to, as individual companies report their pre-exceptional profits on a quarterly basis, and/or waiting until the majority of companies have reported their pre-exceptional profits and then adjusting them all at once. Also, the computing device, under the direction of an investor, could choose to determine the weightings based on, e.g., but not limited to, either the total nominal amount of pre-exceptional profit each quarter or on a cumulative rolling basis.

Constructing a stock market index according to an exemplary embodiment using accounting data based company accounts data or a ratio, or manipulation of that data may provide a series of genuine alternatives for investors who want to invest in a passive style while focusing on fundamentals that they believe are important. For instance, according to an exemplary embodiment an investor may always want to own an index of U.S. or foreign equities that are, e.g., the largest five hundred companies as measured by sales, or by profits, or by growth in sales, or by return on investment, or any accounting data based company accounts data or ratio of that data.

Long-Short Equity Strategies

An exemplary embodiment of the present invention may take long and short positions based on an extent to which accounting data based indexation suggests that equities are under or over valued.

Figure 4:
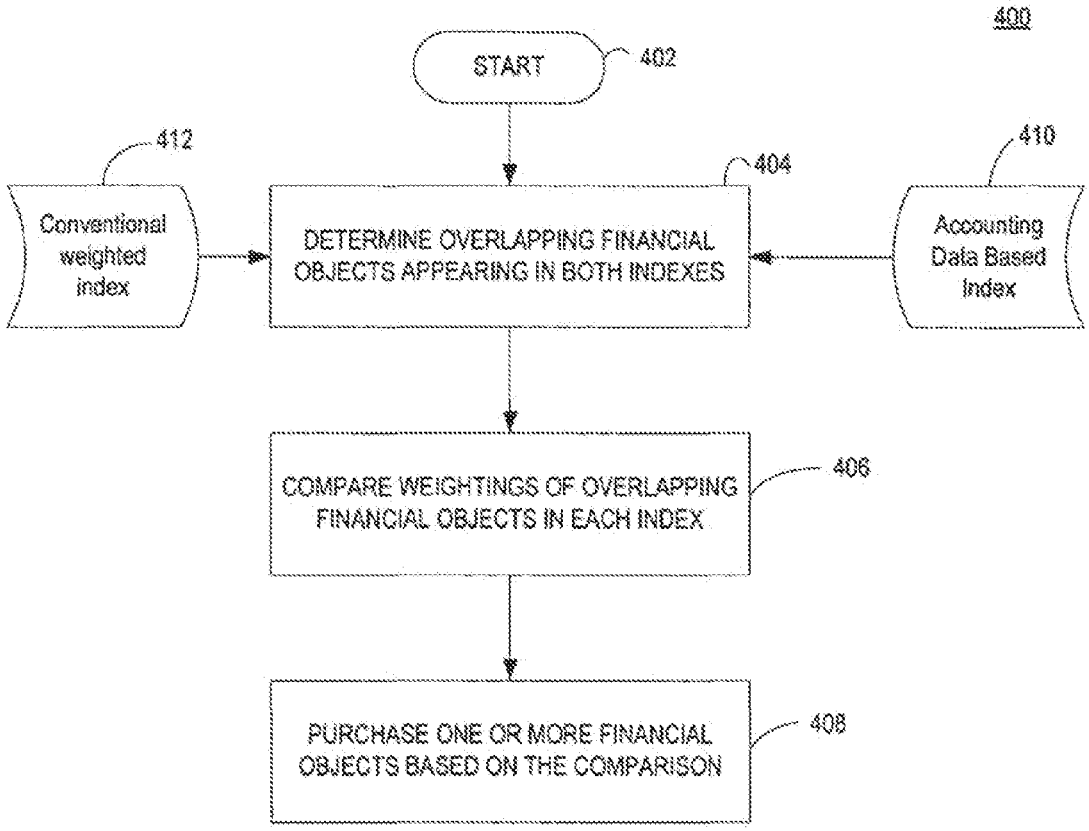
FIG. 4 is a process flow diagram of a method of creating a portfolio of financial objects.

FIG. 4 illustrates an exemplary process flow diagram 400 of a method of creating a portfolio of financial objects according to an embodiment of the present invention. In block 402 the process starts. In block 404, a determination is made of overlapping financial objects that appear in both an accounting data based index (ADBI) 410 and a conventional weighted index 412. In block 406, the weightings of the overlapping financial objects in the ADBI are compared with the weightings of the overlapping financial objects in the conventionally weighted index. Then, in block 408, one or more of the overlapping financial object may be purchased based on the result of the comparison.

In the alternative, exemplary embodiments of the present invention may determine non-overlapping financial objects appearing in only one of either an accounting data based index (ADBI) or a conventional weighted index by comparing financial objects in an ADBI with financial objects in a conventionally weighted index. Non-overlapping financial objects appearing only in the ADBI may be weighted by accounting data based weighting. Non-overlapping financial objects appearing only in the conventionally weighted index may be weighted by the conventional weighting. Financial objects may then be purchased based on the resulting weightings.

In an exemplary embodiment, an index of the largest 1,000 U.S. equities, weighted by accounting data, may overlap an index of the largest 1,000 U.S. capitalization-weighted companies by approximately 80%. The 20% of non-overlapping companies may drive the 2.0% increase in return of an accounting data based index such as, e.g., but not limited to, RESEARCH AFFILIATES FUNDAMENTAL INDEX™ (RAFI™) available from Research Affiliates. LLC of Pasadena, Calif., versus a cap-weighted index. A long-short strategy according to an exemplary embodiment is designed to leverage this 20% of companies that do not overlap, and may capture the expected alpha from the accounting data based indexation. An exemplary long-short U.S. equity strategy may be approximately beta and dollar neutral and can replace or complement market neutral or long-short strategies, or as part of a portfolio's alternative strategies bucket.

Accounting data based indexation may use economic measures of company size in constructing indexes. Using accounting data based economic measures of firm size may create an index that is indifferent to price. Accounting data based indexes may avoid flaws inherent in capitalization (price)-weighted indexes. Capitalization-weighted indexes naturally overweight overvalued stocks and underweight undervalued stocks. Accounting data based indexes may more accurately estimate a true fair value of a company, allowing the weight of a company's stock in the index to rise or fall only to the extent that the underlying economic value of the issuing company may rise or hill.

ADBI Portfolio Construction

Figure 5:
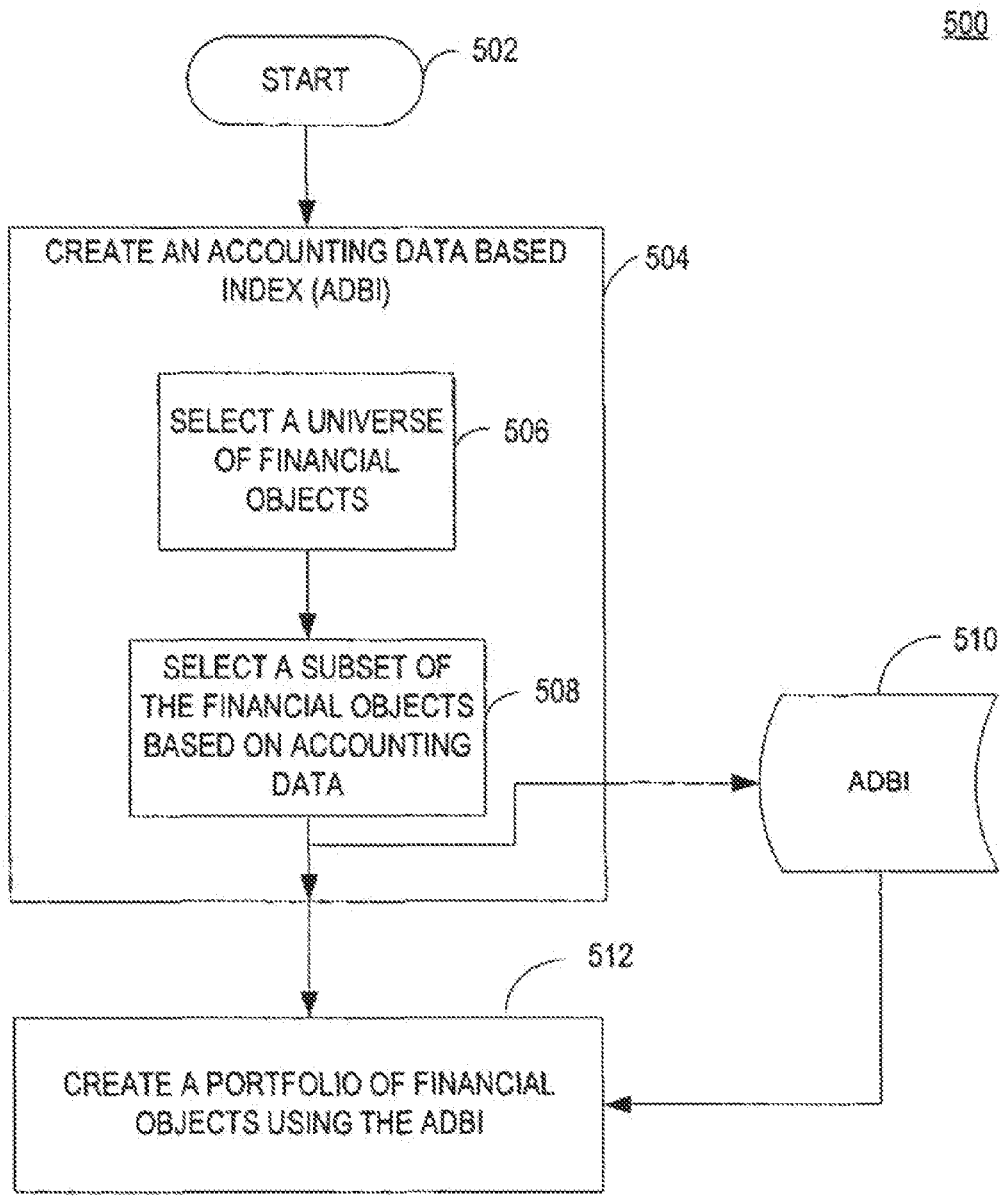
FIG. 5 is a process flow diagram of a method of constructing an ADBI and a portfolio of financial objects using the ADBI.

FIG. 5 illustrates an exemplary flow process diagram 500 of a method of constructing an ADBI and a portfolio of financial objects using the ADBI, starting at block 502. In block 504, the ADBI 510 is created. Creating the ADBI may include, in block 506, selecting a universe of financial objects, and, in block 508, selecting a subset of the universe based on the accounting data to obtain the ADBI 510. Then, in block 512, a portfolio of financial objects is created using the ADBI 510, including weighting the financial objects in the portfolio according to a measure of value of a company associated with each financial object in the portfolio.

To construct an exemplary accounting data based index (ADBI), such as, e.g., but not limited to, the RESEARCH AFFILIATES FUNDAMENTAL INDEX™ (RAFI™), some number of financial objects, e.g., 1000 US equities, may be selected and/or weighted based on the following four accounting data based measures of firm size: book equity value, free cash flow, sales, and gross dividends.

An exemplary embodiment of an accounting data based index such as, e.g., but not limited to, the RAFI™ index may first weight all US equities by each of the four accounting data based measures of firm size detailed above. According to an exemplary embodiment, an optimal relative weighting between the four factors may differ by geography of the stock market from which the equities are selected such as, e.g., an equal weighting may be optimal in one country or industry sector, while a different relative weighting between the factors may make sense in another country or industry sector. The index may then compute an overall weight for each holding by equally-weighting each of the four accounting data based measure of firm size according to an exemplary embodiment. For example, assume that a company has the following weights: 2.8% of total US book values, 2% of total US cash flow, 3% of total US sales, and 2.2% of total US dividends.

Equally-weighting these four accounting data based measures of firm size (i.e., book value, cashflow, sales and dividends) may produce a weight of 2.5%. According to an exemplary embodiment, for companies that have never paid dividends, one may exclude dividends from the calculation of the company's accounting data based weight. Finally, in an exemplary embodiment, the 1000 equities with the highest accounting data based weights may be selected and may be assigned a weight in the RAFI™ portfolio equal to its accounting data based weight.

According to another exemplary embodiment, an accounting data based index such as, e.g., but not limited to, RAFI™ maybe constructed using aggregate (not per-share) measures of firm size. For example, RAFI™ may use total firm cash flow instead of cash flow per share and total book value instead of book value per share in its construction.

In an exemplary embodiment, the accounting data may include the following four factors, book value, sales/revenue, cash flow and dividends. In another exemplary embodiment, only one or more of these factors may be used. In another exemplary embodiment, additional factors may be used, such as, e.g., any other accounting data. In one exemplary embodiment, the weightings of each of these factors may be equal relative to one another, i.e., 25% of each of book value, sales/revenue, cash flow and dividends. In one exemplary embodiment, if there are no dividends, then the other three factors may be weighted in equal parts, i.e., 33% each to book value, sales/revenue, and cash flow. In another exemplary embodiment, dividends may be weighted in a greater part such as, e.g., but not limited to, weighting dividends at 50% and book value, sales/revenue, and cash flow at ⅙th each, etc. In one exemplary embodiment, weightings may be the same, depending on the country or sovereign of origin or the industry sector of the stock or other financial object. In another exemplary embodiment, weightings may vary depending on the country or sovereign of origin or the industry sector of the stock or other financial object. In another exemplary embodiment, weightings may vary based on other factors, such as, e.g., but not limited to, types of assets, industry sectors, geographic sectors, sizes of companies, profitability of companies, amount of revenue generated by the company, etc.

An accounting data based index may be available in several varieties to meet the unique needs of different classes of retail and institutional investors, including, e.g., but not limited to, as enhanced portfolios, Exchange Traded Funds (ETFs), open-end mutual funds, tax managed portfolios, a collection of financial objects managed collectively but tracked separately, and closed-end mutual funds. Various US and international investment managers may offer, e.g., but not limited to, a suite of products.

A limited partnership or other fund or account investing in assets based on an Accounting Data Based Index, such as, e.g., Research Affiliates Fundamental Index, L.P. (RAFI LP) may increase the alpha generated by accounting data based indexation in the US through improvements or enhancements, including, e.g., but not limited to, monthly cash rebalancing and quality of earnings and corporate governance screens. The additional enhancements available through the LP may be expected to add an additional 40-70 bps of annual outperformance above the 200 basis points (bps) of annual out performance that may be achieved through the use of accounting data based indexing in portfolio construction.

A limited partnership or other fund or account investing in assets based on an ADBI international LP such as, RAFI International LP (RAFI™-I may apply accounting data based indexation to the international equity space in an exemplary embodiment to create an enhanced portfolio of, e.g., but not limited to 1000 international (ex-US) equities. RAFI-I may be expected to outperform capitalization weighted indexes by approximately 250 bps per year. Like the other RA Fundamental Index LP's, RAFI-I is an enhanced portfolio that may use monthly cash rebalancing and quality of earnings and corporate governance screens to improve upon the performance of the RAFI International index.

Open-end mutual funds may manage financial objects employing a fixed income strategy and portable alpha using the Accounting Data Based Index (ADBI) according to an exemplary embodiment.

An Exchange Traded Fund (ETF) of the ADBI such as, e.g., but limited to, POWERSHARES FTSE RAFI US 1000 Portfolio ETF (ticker symbol: PRF) may meet needs of retail and institutional investors interested in a low-cost means of accessing the power of accounting data bused indexing in another exemplary embodiment.

Another exemplary embodiment includes a closed-end fund implementing accounting data based indexing such as, e.g., Canadian Fundamental Income 100, a closed-end mutual fund of the largest 100 accounting data based equities in Canada which attracted investments from retail and institutional investors in 2005, one of the most difficult closed end markets in recent history, demonstrating the strength of the accounting data based indexation strategy.

Accounting Data Based Indexation Long-Short (ADBI-LS)

Accounting data based indexation long-short (ADBI-LS) such as, e.g., but not limited to, RAFI-LS, is a long-short U.S. equity strategy that leverages ADBI such as RAFI™ innovation. The RAFI U.S. 1000 portfolio is designed to outperform the Russell 1000 (and the S&P 500) by about 200 bps per annum. By going long in stocks that have greater weight in the RAFI U.S. 1000 portfolio relative to the Russell 1000 and short in the stocks that are underweight in the RAFI U.S. 1000 relative to the Russell 1000, the RAFI-LS strategy captures the RAFI alpha process and enhances that alpha source.

ADBI-LS such as, e.g., RAFI-LS according to an exemplary embodiment, is designed to be roughly dollar and beta neutral, but not sector neutral. The sector bet can be significant if the ADBI strategy determines that a sector is substantially overvalued.

In general the overlap between ADBI RAFI U.S. 1000 and capitalization based index Russell 1000 may be about 75%. This may give 25% weights for the long portfolio and 25% weights for the short portfolio. The portfolio may be applied to 300% long and 300% short, which may magnify the RAFI alpha and the portfolio volatility. Leverage may be applied tactically, and can range from about 200% long/short to about 400% long/short according to exemplary embodiments.

ADBI-LS such as, e.g., RAFI-LS according to an exemplary embodiment may be designed to achieve an annual volatility of 15-25%. Volatility of the exemplary RAFI-LS, since inception, has been about 15%.

According to an exemplary embodiment, ADBI-LS, such as, e.g., RAFI-LS may use leverage in both its short and long positions. On average, $100 invested in RAFI-LS may result in a $300 notional long position and a $300 notional short position.

Implementation of an ADBI-LS's Long and Short Positions

According to an exemplary embodiment, one does not necessarily directly need to hold long or short positions in the underlying stocks, nor does it need to access a direct line of credit for the portfolio leverage. Instead, according to an exemplary embodiment, derivatives, such as a total return swaps may be used to implement the long and short positions. It may be possible to achieve minimal counterparty default risk exposure by entering into swaps with large Wall Street firms in an exemplary embodiment. Investors in an ADBI-LS may not be physically shorting any U.S. equities; rather, investors may merely hold OTC derivative contracts. This may provide both tax benefits and efficiency in investment logistics.

ADBI-LP such as, e.g., RAFI-LP™, may be a full-market ADBI. ADBI-LS such as, e.g., RAFI-LS™, may be a fund that uses the differences between company weights in ADBI such as, e.g.. RAFI™ and in a capitalization-weighted index to establish long and short positions according to an exemplary embodiment.

ADBI-LS may be designed to be dollar neutral and equity beta neutral in an exemplary embodiment. Therefore, one may expect ADBI-LS returns to be largely uncorrelated with the equity market return in an exemplary embodiment. However, ADBI may not be market neutral in the traditional sense as it is not industry sector neutral in an exemplary embodiment.

ADBI-LS does not pair positions, and thus is different from traditional equity long-short strategies whereby e.g., but not limited to, a short General Motors (GM) position is paired with a long Ford position. Instead, ADBI-LS may acquire both long and short positions based on the relative difference between the ADB Index such as, e.g., FUNDAMENTAL INDEX™ weights and those of a cap-weighted index, such as, e.g., but not limited to the Russell 1000.

An exemplary embodiment of ADBI-LS may rebalance periodically and/or aperiodically. For example, on average, the ADBI-LS, such as, e.g., RAFI-LS portfolio may hold its long-short bets for about one year. The cash flow from new capital contributed to the strategy may be used to rebalance the portfolio to create or alter existing long-short bets according to an exemplary embodiment.

In an exemplary embodiment, the present invention may be a method of constructing a portfolio of financial objects, comprising: purchasing a portfolio of a plurality of mimicking financial objects to obtain and/or create a mimicking portfolio, wherein performance of the portfolio of mimicking financial objects substantially mirrors the performance of the accounting data based index based portfolio without substantially replicating the accounting data based index based portfolio. The method may further obtain and/or use a risk model for the portfolio where the risk model mirrors a risk model of the accounting data based index. The risk model may be substantially similar to the Fama-French factors, wherein the Fama-French factors may comprise at least one of size effect (e.g., where small cap beats large cap), value effect (e.g., where high B/P beats low B/P), and/or momentum effect (e.g. where strong momentum beats weak momentum in very long run, e.g. 10 or more years). The performance of the portfolio of mimicking financial objects may substantially mirror the performance of the accounting data based index based portfolio without substantially replicating financial objects and/or weightings in the accounting data based index based portfolio.

In another exemplary embodiment, the present invention may include purchasing a plurality of financial objects according to weightings substantially similar to the weightings of an accounting data based index (ADBI), where performance of the financial objects substantially mirrors the performance of the ADBI without using substantially the same financial objects in the ADBI.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for construction of an index of financial objects, the computer-implemented method comprising:

creating, by at least one computer, the index of the financial objects, said creating comprises:

selecting, by the at least one computer, financial objects as constituents of the index based upon at least one accounting data regarding entities issuing the financial objects rather than price of the financial objects, wherein the at least one accounting data comprises at least one of: cash flow of the entities issuing the financial objects, sales of the entities issuing the financial objects, book value of the entities issuing the financial objects or any dividends of the entities issuing the financial objects; and weighting, by the at least one computer, the constituents of the index based upon at least one accounting data regarding the entities issuing the financial objects rather than price of the financial objects, to obtain constituent weightings of the constituents of the index, wherein the at least one accounting data comprises at least one of: cash flow of the entities issuing the financial objects, sales of the entities issuing the financial objects, book value of the entities issuing the financial objects or any dividends of the entities issuing the financial objects, and managing, by the at least one computer, the index, and managing at least one portfolio of financial objects based on the index comprising:

altering, by the at least one computer, the relative weightings of the financial objects within said at least one portfolio of financial objects based on the index as the at least one accounting data concerning the entities of the financial objects changes or the constituents of the index change over time.

2. The computer-implemented method of claim 1, wherein the computer implemented method comprises:

creating, by the at least one computer, said index of financial objects wherein the constituent weightings are based upon any ratio of at least one accounting data, or any manipulation of at least one accounting data, that is contained within a company financial report.

3. The computer-implemented method of claim 1, wherein the computer implemented method comprises:

creating, by the at least one computer, said index of financial objects wherein the constituent weightings are based upon any ratio of at least one accounting data per share, or any manipulation of at least one accounting data, that is contained within a company financial report.

4. The computer implemented method of claim 1, wherein said altering comprises at least one of:

altering based on at least one of: changes in relative weightings of financial objects in said index; or changes in said financial objects that are members of said index; or altering at the time of at least one of: when, or after, at least one entity associated with a given financial object of said index reports its accounting information.

5. The computer-implemented method of claim 1, wherein said financial object comprises:

at least one unit of interest in at least one of:

an asset;

a liability;

a tracking portfolio;

a financial instrument or a security, wherein said financial instrument or said security denotes a debt, an equity interest, or a hybrid;

a derivatives contract, including at least one of:

a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability;

a fund; or an investment entity of any kind, including an interest in, or rights relating to at least one of:

a hedge fund, an exchange traded fund (ETF), a fund of funds, a mutual fund, an investment vehicle, or any other pooled or separately managed investments.

6. The method of claim 1, wherein said at least one accounting data *rather than price* further comprises at least one of:

inventory of the entity;
revenue of the entity;
sales of the entity;
income of the entity;
book income of the entity;
taxable income of the entity;
earnings growth rate of the entity;
earnings before interest and tax (EBIT) of the entity;
earnings before interest, taxes, depreciation, and amortization (EBITDA) of the entity;
expected earnings of the entity;
retained earnings of the entity;
expected revenue of the entity;
number of employees of the entity;
capital expenditures of the entity;
salaries of the entity;
book value of the entity;
assets of the entity;
fixed assets of the entity;
current assets of the entity;
quality of assets of the entity;
operating assets of the entity;
intangible assets of the entity;
dividends of the entity;
gross dividends of the entity;
[dividend yields of the entity;]
expected dividends of the entity;
cash flow of the entity;
expected cash flow of the entity;
liabilities of the entity;
losses of the entity;
long term liabilities of the entity;
short term liabilities of the entity;
liquidity of the entity;
long term debt of the entity;
short term debt of the entity;
bonds of the entity;
corporate bonds of the entity;
net worth of the entity;
shareholder equity of the entity;
goodwill of the entity;
research and development expenditures of the entity;
costs of the entity;
cost of goods sold (COGS) of the entity; or
research and development costs of the entity.

7. The computer-implemented method of claim 1, wherein the computer implemented method comprises:

creating, by the at least one computer, said index wherein the constituent weightings are based upon weighting of said cash flows of the entities issuing the financial objects, said sales of the entities issuing the financial objects, and said book value of the entities issuing the financial objects.

8. The computer-implemented method of claim 1, wherein the computer implemented method comprises:

creating, by the at least one computer, said index wherein the constituent weightings are based upon equally weighting said cash flows of the entities issuing the financial objects, said sales of the entities issuing the financial objects, and said book value of the entities issuing the financial objects.

9. The computer-implemented method of claim 1, wherein the constituent weightings are based upon equally weighting said cash flows of the entities issuing the financial objects, said sales of the entities issuing the financial objects, and said book value of the entities issuing the financial objects, at ⅓ each.

10. The computer-implemented method of claim 1, wherein the computer implemented method comprises:

creating, by the at least one computer, said index wherein the constituent weightings are based upon weighting of said cash flows of the entities issuing the financial objects, said sales of the entities issuing the financial objects, said book value of the entities issuing the financial objects, and said any dividends of the entities issuing the financial objects.

11. The computer-implemented method of claim 1, wherein the computer implemented method comprises:

creating, by the at least one computer, said index wherein the constituent weightings are based upon equally weighting of said cash flows of the entities issuing the financial objects, said sales of the entities issuing the financial objects, said book value of the entities issuing the financial objects, and said any dividends of the entities issuing the financial objects.

12. The computer-implemented method of claim 1, wherein the constituent weightings are based upon:

equally weighting by the at least one computer, said cash flows of the entities issuing the financial objects, said sales of the entities issuing the financial objects, said book value of the entities issuing the financial objects, and said any dividends of the entities issuing the financial objects, at ¼ each, for financial objects with dividends; and equally weighting by the at least one computer, said cash flows of the entities issuing the financial objects, said sales of the entities issuing the financial objects, and said book value of the entities issuing the financial objects, at ⅓ each, for financial objects with no dividends.

13. The computer-implemented method of claim 1, wherein the constituent weighting of the entity of the financial object is based upon the at least one accounting data of the entity of the financial object relative to the total at least one accounting data of the entities of the financial objects.

14. The computer-implemented method of claim 1, wherein the constituent weightings are adjusted based on at least one of: a country, a sovereign of origin of the entity of the financial object, or an industry sector of the entity of the financial object.

15. The computer-implemented method of claim 1, wherein said selecting comprises selecting, by the at least one computer, a set of the entities of the financial objects of a universe of financial objects.

16. The computer-implemented method of claim 15, wherein said selecting is relative to the at least one accounting data of the entities of the financial objects of the universe.

17. The computer-implemented method of claim 16, wherein said selecting comprises:

selecting by the at least one computer, the set of the entities of the financial objects based on weighting the relative size of the at least one accounting data of the entity of each financial object relative to a total of the at least one accounting data of the entities of the financial objects of the universe.

18. The computer-implemented method of claim 15, wherein said any dividends of the entities of the financial objects comprise the averaged total dividend distributions of the entities of the financial objects for a period of time, said cash flows of the entities of the financial objects comprise the averaged cash flow of the entities of the financial objects for the period of time, and said sales of the entities of the financial objects comprise the averaged sales of the entities of the financial objects for the period of time.

19. The computer-implemented method of claim 18, wherein the period of time comprises at least one of: at least a quarter, at least a year, or at least five years.

20. The computer-implemented method of claim 15, wherein said selecting comprises:

selecting, by the at least one computer, a set of the entities of the financial objects based upon weighting the relative size of an average of the at least one accounting data of the entity of the financial object relative to a total of the averaged at least one accounting data of the entities of the financial objects of said universe.

21. The computer-implemented method of claim 15, wherein said selecting the set comprises:

calculating, by the at least one computer, measures of value for the entities of the financial objects based upon said at least one accounting data regarding the entities of the financial objects; and selecting, by the at least one computer, a set of the entities of the financial objects based on the measures of value.

22. The computer-implemented method of claim 21, wherein said selecting the set of the entities of the financial objects comprises selecting, by the at least one computer, a fixed number of the entities of the financial objects with the largest measures of value from the universe.

23. The computer-implemented method of claim 15, wherein said universe comprises at least one of:

publicly traded companies;
a sector;
a market;
a market sector;
an industry sector;
a geographic sector;
an international sector;
a sub-industry sector;
a government issue; or
a tax exempt financial object.

24. The computer-implemented method of claim 15, wherein said weighting comprises:

determining by the at least one computer, the constituent weighting of the entities of the financial objects of the set, by the at least one computer, based upon weighting the relative size of an average of the at least one accounting data of entities issuing financial objects for a period of time relative to a total of the averaged at least one accounting data of the entities of the financial objects of said universe.

25. The computer-implemented method of claim 1, wherein the constituent weightings of the entities of the financial objects are based on a proportion of types of financial objects issued by the same entity.

26. The computer-implemented method of claim 1, further comprising:

(a) gathering, by the at least one computer, the at least one accounting data about a plurality of the financial objects;

(b) selecting, by the at least one computer, a plurality of financial objects based on an objective measure of scale comprising at least one accounting data of the entity associated with each of said plurality of financial objects to create said index of financial objects; and (c) weighting, by the at least one computer, each of said plurality of financial objects selected in said index based on an objective measure of scale comprising at least one accounting data of the entity associated with each of said plurality of financial objects, wherein said weighting comprises:

(i) weighting by the at least one computer at least one of said plurality of financial objects based on said at least one accounting data; and (ii) weighting is exclusive of weighting based on market capitalization, equal weighting, and share price weighting.

27. The method according to claim 26, wherein said weighting based on the objective measure of scale comprises weighting by the at least one computer based on said any dividends of the entities issuing the financial objects, said book value of the entities issuing the financial objects, said cash flows of the entities issuing the financial objects, or said sales of the entities issuing the financial objects.

28. The method of claim 27, further comprising equally weighting by the at least one computer, each objective measure of scale.

29. The method of claim 26, wherein (c) comprises weighting by the at least one computer based on said objective measure of scale, wherein said objective measure of scale comprises a measure of the entity size associated with each of said plurality of financial objects.

30. The method of claim 29, wherein said measure of the entity size comprises at least one of:

inventory of the entity;
revenue of the entity;
sales of the entity;
income of the entity;
book income of the entity;
taxable income of the entity;
earnings growth rate of the entity;
earnings before interest and tax (EBIT) of the entity;
earnings before interest, taxes, depreciation, and amortization (EBITDA) of the entity;
expected earnings of the entity;
retained earnings of the entity; expected revenue of the entity;
number of employees of the entity;
capital expenditures of the entity;
salaries of the entity;
book value of the entity;
assets of the entity;
fixed assets of the entity;
current assets of the entity;
quality of assets of the entity;
operating assets of the entity;
intangible assets of the entity;
dividends of the entity;
gross dividends of the entity;
[dividend yields of the entity;]
expected dividend of the entity;
cash flow of the entity;
expected cash flow of the entity;
liabilities of the entity;
losses of the entity;
long term liabilities of the entity;
short term liabilities of the entity;
liquidity of the entity;
long term debt of the entity;
short term debt of the entity;
bonds of the entity;
corporate bonds of the entity;
net worth of the entity;
shareholder equity of the entity;
goodwill of the entity;
research and development expenditures of the entity;
costs of the entity;
cost of goods sold (COGS) of the entity; or
research and development costs of the entity.

31. A computer-implemented method of claim 1, further comprising:

creating, by at least one computer, a portfolio of financial objects comprising purchasing constituent financial objects of the index in proportion to the constituent weightings of the constituents of the index.

32. The method of claim 1, wherein said at least one accounting data *rather than price* further comprises at least one of:

a financial ratio of a company;
a ratio of accounting based data;
a ratio of accounting based data per share;
a ratio of a first accounting based data to a second accounting based data;
a liquidity ratio;
a working capital ratio;
a current ratio;
a quick ratio;
a cash ratio;
an asset turnover ratio;
a receivables turnover ratio;
[an average collection period ratio;]
an average collection period ratio;
an inventory turnover ratio;
an inventory period ratio;
a leverage ratio;
a debt ratio;
a debt-to-equity ratio;
an interest coverage ratio;
a profitability ratio;
a return on common equity (ROCE) ratio;
profit margin ratio;
an earnings per share (EPS) ratio;
a gross profit margin ratio;
a return on assets ratio;
a return on equity ratio;
a dividend policy ratio; [a dividend yield ratio;] or
a payout ratio.

33. The computer-implemented method of claim 1, further comprising: selecting a subset of a universe of financial objects based on at least one of: a liquidity of the financial objects, or a minimum size of said entity of said financial object.

34. The computer-implemented method of claim 1, wherein said at least one accounting data regarding entities issuing the financial objects further comprises net income of the entities issuing the financial objects.

35. The computer-implemented method of claim 1, wherein said selecting comprises:

calculating a first weight of a first accounting data of said at least one accounting data regarding an entity;

calculating a second weight of a second accounting data of said at least one accounting data regarding the entity;

averaging the first weight and the second weight to obtain an averaged weight; and selecting the entity based on the averaged weight.

36. The computer-implemented method of claim 1, wherein said weighting comprises:

calculating a first weight of a first accounting data of said at least one accounting data regarding an entity;

calculating a second weight of a second accounting data of said at least one accounting data regarding the entity;

averaging the first weight and the second weight to obtain an averaged weight; and weighting the entity based on the averaged weight.

37. The computer-implemented method of claim 1, further comprising:

quarterly rebalancing the index of financial objects.

38. The method according to claim 1, wherein said selecting said financial objects further comprises selecting a universe and selecting a subset of said universe.

39. The method according to claim 38, wherein said subset comprises at least one of:

a subset based upon at least one criteria;

a sector;

a market;

a market sector;

an industry sector;

a geographic sector;

an international sector;

a sub-industry sector;

a government issue; or a tax exempt financial object.

40. The method according to claim 38, wherein said universe comprises at least one of:

publicly traded stocks of at least one of: at least one country, or at least one country's at least one stock market;

at least one sector;

at least one market;

at least one market sector;

at least one growth market sector;

at least one value market sector;

at least one industry sector;

at least one geographic sector;

at least one international sector;

at least one sub-industry sector;

at least one government issue;

at least one measure of value;

[at least one price-based ratio sector;]

at least one size of an entity;

at least one market size of an entity;

any measure of size of an entity;

at least one size of a company; or at least one tax exempt financial object.

41. The method according to claim 38, wherein said selecting said subset of said universe comprises selecting upon at least one of: a liquidity of the financial objects, or a minimum size of the entity of the financial object.

42. The method according to claim 38, wherein said selecting said subset comprises selecting, by the at least one processor based on user input, said subset based on any measure of company size.

43. The method according to claim 42, wherein said selecting said subset comprises selecting, by the at least one processor based on user input, said subset based on at least one of: a maximum measure of company size, a minimum measure of company size, or a range of measures of company size.

44. The method according to claim 38, wherein said selecting said universe comprises selecting a universe based on any measure of company size.

45. The method according to claim 44, wherein said selecting said subset comprises selecting, by the at least one processor based on user input, said subset based upon at least one of: a minimum measure of said company size; a maximum measure of said company size, or a range of measures of said company size.

46. The method according to claim 38, *further comprising:* wherein at least one of said selecting said universe or said selecting said subset, *further* comprises: selecting, by the at least one processor based on user input, based upon a measure of company size comprising at least one of: a large cap, a mid cap, or a small cap.

47. The method according to claim 38, further comprising:

dividing, by the at least one processor based on user input, said index into at least one partition of said index based upon at least one measure of scale of entities of the financial objects in said index.

48. The method according to claim 38, further comprising:

selecting, by the at least one processor based on user input, at least a portion of said index based upon any measure of scale of entities of the financial objects in said index.

49. The method according to claim 38, wherein said universe comprises publicly traded stocks of all companies in at least one of: a given country; or at least one stock market of a given country.

50. The method according to claim 38, wherein said subset is selected based upon a measure of company size comprising at least one of:

a financial ratio of a company;

a ratio of accounting based data;

a ratio of accounting based data per share;

a ratio of a first accounting based data to a second accounting based data;

a liquidity ratio;

a working capital ratio;

a current ratio;

a quick ratio;

a cash ratio;

an asset turnover ratio;

a receivables turnover ratio;

[an average collection period ratio;]

an average collection period ratio;

an inventory turnover ratio;

an inventory period ratio;

a leverage ratio;

a debt ratio;

a debt-to-equity ratio;

an interest coverage ratio;

a profitability ratio;

a return on common equity (ROCE) ratio;

profit margin ratio;

an earnings per share (EPS) ratio;

a gross profit margin ratio;

a return on assets ratio;

a return on equity ratio;

a dividend policy ratio; [a dividend yield ratio;] or a payout ratio.

51. The method according to claim 1, further comprising:

selecting, by the at least one processor based on user input, a subset of an accounting data based index (ADBI) based on a measure of scale of entities in said ADBI.

52. The method according to claim 1, wherein said creating said index, said managing said index, and said managing said at least one portfolio are performed by at least one of: a same entity as, or one or more separate entities.

53. A computer-implemented method for construction of a portfolio based on an index, wherein selecting financial objects as constituents of the index and weighting of the constituents of the index is based upon at least one accounting data regarding entities issuing the financial objects rather than price data of the financial object, the computer-implemented method comprising:

creating, by at least one computer, the portfolio of financial objects comprising purchasing constituent financial objects of the index in proportion to constituent weightings of the constituents of the index, wherein the index was created by an index provider having:

selected, by the at least one computer, financial objects as said constituents of the index based upon at least one accounting data regarding entities issuing the financial objects rather than price of the financial objects, wherein the at least one accounting data comprises at least one of: cash flow of the entities issuing the financial objects, sales of the entities issuing the financial objects, book value of the entities issuing the financial objects or any dividends of the entities issuing the financial objects; and weighted, by the at least one computer, the constituents of the index based on at least one accounting data related to the entities of the financial objects rather than price of the financial objects, to obtain the constituent weightings of the constituents of the index, wherein the at least one accounting data comprises at least one of: cash flow of the entities issuing the financial objects, sales of the entities issuing the financial objects, book value of the entities issuing the financial objects or any dividends of the entities issuing the financial objects, and managing the portfolio comprising:

purchasing, by the at least one computer, financial objects at least one of: added to the index or having increased constituent weighting over time; and selling, by the at least one computer, financial objects at least one of: removed from the index or having decreased constituent weighting over time.

54. The computer-implemented method of claim 53, wherein said at least one accounting data regarding entities issuing the financial objects further comprises net income of the entities issuing the financial objects.

55. The method according to claim 53, wherein said creating said portfolio, said purchasing, said selling, and said managing are performed by at least one of: a same entity as, or one or more separate entities other than, the index provider.

56. A computer-implemented method for construction of an index and portfolio of financial objects based upon cash flow, sales, book value, and any dividends of the financial objects, the computer-implemented method comprising:

creating, by at least one computer, an index of the financial objects, comprising:

selecting, by the at least one computer, a plurality of selected financial objects to be placed in said index wherein said selecting comprises:

selecting, by the at least one computer, financial objects to be placed in said index based upon a cash flow, or a ratio of said cash flow, of an entity associated with a given financial object, selecting, by the at least one computer, the financial objects to be placed in said index based upon sales, or a ratio of said sales, of the entity associated with the given financial object, selecting, by the at least one computer, the financial objects to be placed in said index based upon a book value, or a ratio of said book value, of the entity associated with the given financial object, and selecting, by the at least one computer, the financial objects to be placed in said index based upon any dividends, or a ratio of said any dividends, of the entity associated with the given financial object; and weighting, by the at least one computer, said plurality of selected financial objects placed in said index, wherein said weighting comprises:

weighting, by the at least one computer, said selected financial objects placed in said index based upon a cash flow, or a ratio of said cash flow, of an entity associated with a given financial object, weighting, by the at least one computer, said selected financial objects placed in said index based upon sales, or a ratio of said sales, of the entity associated with the given financial object, weighting, by the at least one computer, said selected financial objects placed in said index based upon a book value, or a ratio of said book value, of the entity associated with the given financial object, and weighting, by the at least one computer, said selected financial objects placed in said index based upon any dividends, or a ratio of said any dividends, of the entity associated with the given financial object; and creating, by the at least one computer, at least one portfolio of financial objects based on said index comprising:

purchasing, by the at least one computer, said selected financial objects placed in said index in proportion to said weightings based upon said cash flow, said sales, said book value, and said any dividends, or said ratio of said cash flow, said ratio of said sales, said ratio of said book value, and said ratio of said any dividends, and placing said purchased financial objects into said at least one portfolio.

57. The computer-implemented method of claim 56, wherein the computer implemented method comprises:

creating, by the at least one computer, said index of financial objects, and said at least one portfolio of financial objects based on said index wherein said weightings are based upon at least one of: any ratio of at least one accounting data, any ratio of at least one accounting data per share, or any manipulation of at least one accounting data, wherein the at least one accounting data is contained within a company financial report.

58. The computer implemented method of claim 56, wherein the computer implemented method comprises:

managing, by the at least one computer, said index, and said at least one portfolio of financial objects based on said index comprising:

altering, by the at least one computer, said at least one portfolio based on said index as the at least one accounting data concerning the entities of the financial objects changes or said plurality of selected financial objects placed in said index change over time.

59. The computer implemented method of claim 58, wherein said altering comprises at least one of:

altering based on at least one of: changes in said weightings of financial objects in said index or changes in said financial objects that are placed in said index; or altering at the time of at least one of: when, or after, at least one entity associated with a given financial object of said index reports its accounting information.

60. The computer-implemented method of claim 56, wherein said financial object comprises:

at least one unit of interest in at least one of:

an asset;

a liability;

a tracking portfolio;

a financial instrument or a security, wherein said financial instrument or said security denotes a debt, an equity interest, or a hybrid;

a derivatives contract, including at least one of:

a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability;

a fund; or an investment entity of any kind, including an interest in, or rights relating to at least one of:

a hedge fund, an exchange traded fund (ETF), a fund of funds, a mutual fund, an investment vehicle, or any other pooled or separately managed investments.

61. The computer-implemented method of claim 56, further comprising:

quarterly rebalancing the index.

* * * * *